United States Patent
Hattori et al.

(10) Patent No.: US 11,121,596 B2
(45) Date of Patent: Sep. 14, 2021

(54) STATOR OF BRUSHLESS MOTOR, BRUSHLESS MOTOR, AND METHOD OF MANUFACTURING STATOR OF BRUSHLESS MOTOR

(71) Applicant: DENSO CORPORATION, Kariya (JP)

(72) Inventors: Akihisa Hattori, Kariya (JP); Yoji Yamada, Kariya (JP); Koji Mikami, Kariya (JP); Seiya Yokoyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 378 days.

(21) Appl. No.: 16/079,418

(22) PCT Filed: Feb. 23, 2017

(86) PCT No.: PCT/JP2017/006693
§ 371 (c)(1),
(2) Date: Aug. 23, 2018

(87) PCT Pub. No.: WO2017/150312
PCT Pub. Date: Sep. 8, 2017

(65) Prior Publication Data
US 2019/0013708 A1 Jan. 10, 2019

(30) Foreign Application Priority Data

Feb. 29, 2016 (JP) .............................. JP2016-038219
Jun. 14, 2016 (JP) .............................. JP2016-117846
Oct. 5, 2016 (JP) .............................. JP2016-197583

(51) Int. Cl.
*H02K 1/27* (2006.01)
*H02K 1/14* (2006.01)
(Continued)

(52) U.S. Cl.
CPC .......... *H02K 1/2793* (2013.01); *H02K 1/145* (2013.01); *H02K 3/18* (2013.01); *H02K 3/525* (2013.01); *H02K 15/022* (2013.01)

(58) Field of Classification Search
CPC ...... H02K 21/24; H02K 1/2793; H02K 1/145; H02K 3/18; H02K 1/182; H02K 3/525;
(Continued)

(56) References Cited

U.S. PATENT DOCUMENTS 5,440,185 A * 8/1995 Allwine, Jr. ............. G01B 7/30
310/114
6,034,465 A * 3/2000 McKee ............... F04D 13/0666
310/156.23
(Continued)

FOREIGN PATENT DOCUMENTS

CN 105900315 A 8/2016
JP 8-182229 A 7/1996
(Continued)

OTHER PUBLICATIONS

Yasukawa (JP 2012239315 A) English Translation (Year: 2012).*
(Continued)

*Primary Examiner* — Tulsidas C Patel
*Assistant Examiner* — Robert E Mates
(74) *Attorney, Agent, or Firm* — Kilpatrick Townsend & Stockton LLP

(57) ABSTRACT

A stator of a brushless motor includes a stator core and a plurality of coils. The stator core includes a base portion having an annular plate shape and a plurality of teeth protruding from one surface of the base portion in an axial direction and disposed in a circumferential direction. The plurality of coils is respectively wound by concentrated winding along peripheral surfaces of the plurality of teeth. The base portion includes an inner circumferential edge that
(Continued)

is recessed radially outward from an inner end of each of the plurality of teeth or the base portion includes an outer circumferential edge that is recessed radially inward from an outer end of each of the plurality of teeth.

9 Claims, 17 Drawing Sheets

(51) Int. Cl.
*H02K 15/02* (2006.01)
*H02K 3/52* (2006.01)
*H02K 3/18* (2006.01)

(58) Field of Classification Search
CPC .... H02K 15/022; H02K 16/04; H02K 21/026; H02K 21/37; H02K 21/08; H02K 37/125
USPC .............. 310/49.34, 156.01, 156.32, 156.33, 310/156.35, 156.36, 266
See application file for complete search history.

(56) References Cited

U.S. PATENT DOCUMENTS

| | | | |
|---|---|---|---|
| 2004/0212267 A1 | 10/2004 | Jack et al. | |
| 2006/0028093 A1* | 2/2006 | Minagawa | H02K 1/148 310/268 |
| 2011/0309726 A1* | 12/2011 | Carpenter | H02K 5/1282 310/75 R |
| 2011/0316381 A1 | 12/2011 | Asano et al. | |
| 2014/0103773 A1* | 4/2014 | Yang | H02K 1/2793 310/156.48 |
| 2015/0303745 A1 | 10/2015 | Matsumoto | |
| 2015/0380992 A1 | 12/2015 | Enomoto et al. | |
| 2016/0315510 A1 | 10/2016 | Kawamata et al. | |
| 2016/0322869 A1 | 11/2016 | Takezaki et al. | |

FOREIGN PATENT DOCUMENTS

| | | | |
|---|---|---|---|
| JP | 2005348472 A | | 12/2005 |
| JP | 2006-254619 A | | 9/2006 |
| JP | 2006-524031 A | | 10/2006 |
| JP | 2008187841 A | | 8/2008 |
| JP | 2010-220412 A | | 9/2010 |
| JP | 2010213508 A | | 9/2010 |
| JP | 2012239315 A | * | 12/2012 |
| JP | 2014117029 A | | 6/2014 |
| JP | 2015116033 A | | 6/2015 |
| JP | 2015133787 A | | 7/2015 |
| JP | 2015-171250 A | | 9/2015 |
| WO | 2004/093291 A1 | | 10/2004 |
| WO | 2014/087734 A1 | | 8/2008 |
| WO | 2014/115255 A1 | | 7/2014 |
| WO | 2015/104893 A1 | | 7/2015 |
| WO | 2017/150312 A1 | | 9/2017 |

OTHER PUBLICATIONS

International Preliminary Report on Patentability for PCT/JP2017/006693 dated Sep. 4, 2018, all pages.
International Search Report for PCT/JP2017/006693 dated Apr. 18, 2017, all pages.

* cited by examiner

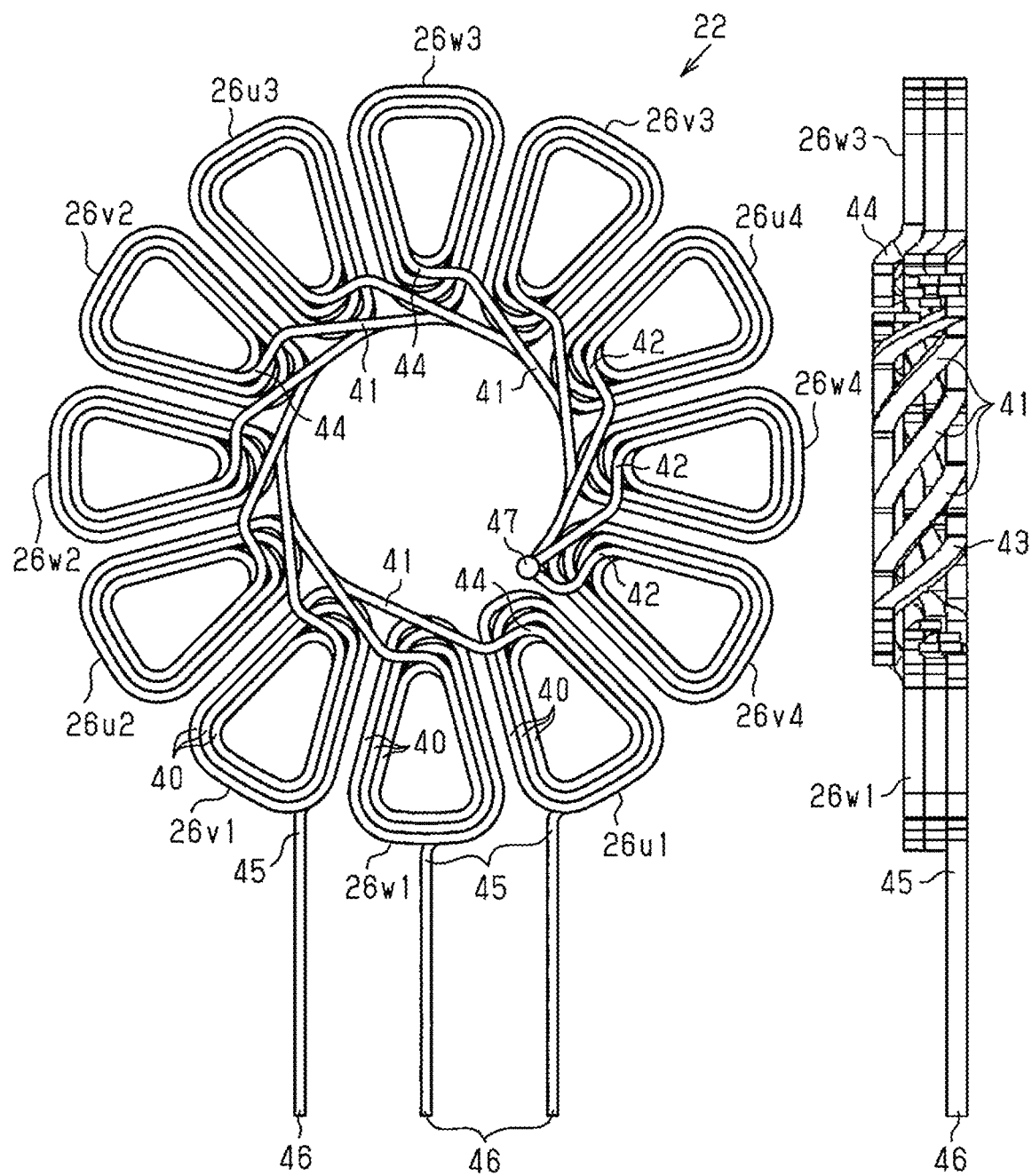

STATOR OF BRUSHLESS MOTOR, BRUSHLESS MOTOR, AND METHOD OF MANUFACTURING STATOR OF BRUSHLESS MOTOR

TECHNICAL FIELD

The present invention relates to a stator of an axial gap type brushless motor, a brushless motor, and a method of manufacturing a stator of a brushless motor.

BACKGROUND ART

Conventionally, there is an axial gap type brushless motor in which a stator and a rotor are disposed to face each other in an axial direction. For example, as disclosed in patent document 1, a stator of this type of motor includes a stator core including a base portion having an annular plate shape, and a plurality of teeth protruding from one surface of the base portion and arranged side by side in a circumferential direction. A plurality of coils is wound by concentrated winding along a peripheral surface of each of the teeth of the stator core. The plurality of coils is configured as three-phase coils, and a driving current corresponding to each of the three-phase coils is supplied.

In addition, for example, as disclosed in patent document 2, an engaging portion is provided in a core body (base portion) so that teeth are press-fitted in the axial direction. This engaging portion may include, for example, a recess or a through-hole extending through in the axial direction.

PRIOR ART DOCUMENT

Patent Document

Patent Document 1: Japanese Laid-Open Patent Publication No. 2015-116033
Patent Document 2: Japanese Laid-Open Patent Publication No. 2005-348472

SUMMARY OF THE INVENTION

Problems That Are to be Solved by the Invention

A motor may be miniaturized by increasing the degree of freedom for arranging a motor component such as connection of a coil with respect to a stator core so that the motor component is efficiently disposed, thereby miniaturizing the stator.

In addition, in a stator of an axial gap type brushless motor such as that described in patent document 2, the teeth are press-fitted into the engaging portion provided in the core body and fixed to the core body. Such press-fitting may crack or chip at least one of the core body and the teeth.

It is an object of the present disclosure to provide a stator of an axial gap type brushless motor and a brushless motor allowing an efficient arrangement structure of a motor component.

It is a further object of the present disclosure to provide a stator of an axial gap type brushless motor, a method of manufacturing a stator, and a brushless motor capable of limiting cracking or chipping of members.

Means for Solving the Problem

To achieve the above object, a first aspect of the present disclosure is a stator of a brushless motor. The stator includes a stator core and a plurality of coils. The stator core includes a base portion having an annular plate shape and a plurality of teeth protruding from one surface of the base portion in an axial direction and disposed in a circumferential direction. The plurality of coils is respectively wound by concentrated winding along peripheral surfaces of the plurality of teeth. The base portion includes an inner circumferential edge that is recessed radially outward from an inner end of each of the plurality of teeth or the base portion includes an outer circumferential edge that is recessed radially inward from an outer end of each of the plurality of teeth.

To achieve the above object, a second aspect of the present disclosure is a stator of a brushless motor. The stator includes a stator core and a plurality of coils. The stator core includes a base portion having an annular plate shape and a plurality of teeth protruding from one surface of the base portion in an axial direction and disposed in a circumferential direction. The plurality of coils is respectively wound by concentrated winding along peripheral surfaces of the plurality of teeth. At least one of an inner circumferential portion and an outer circumferential portion of the stator core includes a cutaway portion recessed in a radial direction.

To achieve the above further object, a third aspect of the present disclosure provides a method of manufacturing a stator of a brushless motor. The stator is configured to be spaced apart from a rotor in an axial direction. The stator includes a stator core including a core body and a plurality of teeth attached to the core body and a plurality of coils respectively wound around the plurality of teeth. The core body includes a plurality of base pieces, each of which has a curved portion and an extension extending from the curved portion. The method includes disposing the plurality of base pieces in an annular shape such that each extension extends in a radial direction and interposing and fixing each of the teeth by the extensions of adjacent ones of the plurality of base pieces. The interposing and fixing each of the teeth is performed during the disposing the plurality of base pieces in an annular shape.

To achieve the above further object, a fourth aspect of the present disclosure is a stator of a brushless motor. The stator is configured to be spaced apart from a rotor in an axial direction. The stator includes a stator core and a plurality of coils. The stator core includes a core body and a plurality of teeth attached to the core body. The plurality of coils is respectively wound around the plurality of teeth. The core body includes a plurality of base pieces disposed in an annular shape. Each of the plurality of base pieces has a curved portion and an extension extending radially inward from the curved portion. The extensions of adjacent ones of the plurality of base pieces are configured to interpose and fix each of the teeth. The teeth are disposed to extend radially inward from the extensions.

BRIEF DESCRIPTION OF THE DRAWINGS

FIG. 7A is a bottom view of the coil group of FIG. 1, and FIG. 7B is a radial sectional view of the coil group of FIG. 1.

EMBODIMENTS OF THE INVENTION

Hereinafter, a description will be given of a first embodiment of a stator of an axial gap type brushless motor and a brushless motor.

Figure 1:
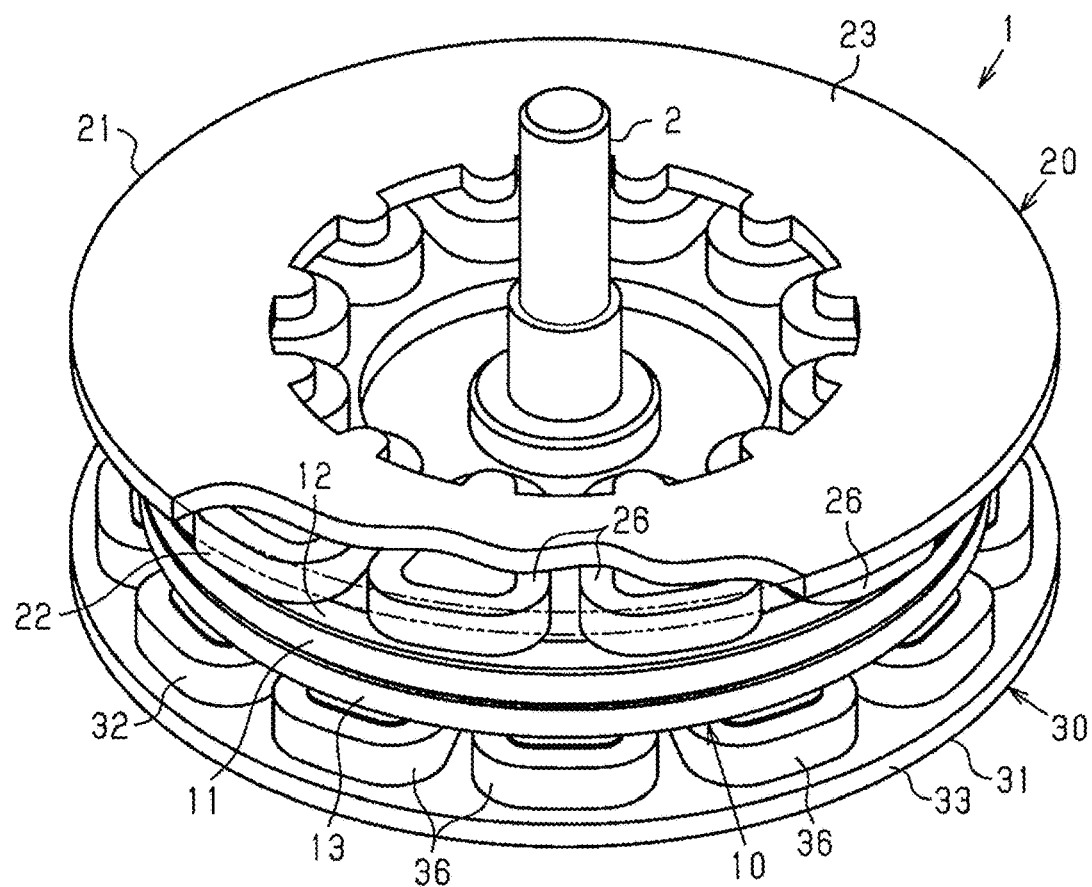
FIG. 1 is a perspective view of a brushless motor according to a first embodiment.

As illustrated in FIG. 1, a brushless motor 1 is an axial gap type brushless motor including a disk-shaped rotor 10 integrally rotatably fixed to a columnar rotating shaft 2 and two stators 20 and 30 (namely, first stator 20 and second stator 30) disposed on opposite sides of the rotor 10 in an axial direction. The rotor 10 and the stators 20 and 30 are accommodated in a housing (not illustrated), and the rotating shaft 2 is rotatably supported with respect to the housing.

Figure 2:
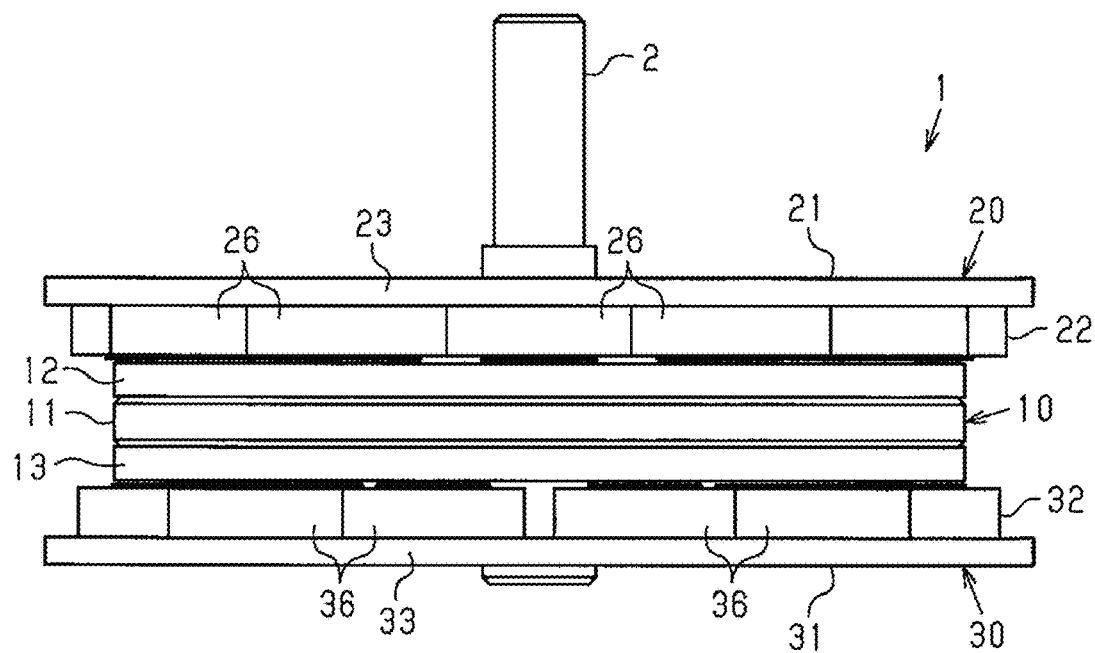
FIG. 2 is a side view of the brushless motor of FIG. 1.

As illustrated in FIGS. 1 and 2, the rotor 10 includes a disk-shaped rotor core 11 and a first magnet 12 and a second magnet 13 fixed to opposite axial end surfaces of the rotor core 11. The rotating shaft 2 is press-fitted into a radial center portion of the rotor core 11. This allows the rotor core 11 to rotate integrally with the rotating shaft 2.

The first magnet 12 fixed to one axial end surface (upper end surface in FIGS. 1 and 2) of the rotor core 11 is provided such that N poles and S poles are alternately arranged in the circumferential direction and has eight magnetic poles (magnetic poles formed on axial end surface of first magnet 12 facing rotor core 11) in the circumferential direction. The eight magnetic poles of the first magnet 12 are provided at equiangular intervals in the circumferential direction.

The second magnet 13 fixed to the other axial end surface (lower end surface in FIGS. 1 and 2) of the rotor core 11 has the same shape as that of the first magnet 12, and has eight magnetic poles provided at equiangular intervals in the circumferential direction. The second magnet 13 is fixed to the rotor core 11 so as to be shifted from the first magnet 12 by one magnetic pole in the circumferential direction. Hence, each magnetic pole of the first magnet 12 and each magnetic pole of the second magnet that overlap in the axial direction differ from each other in magnetic polarity (N pole and S pole).

In the present embodiment, the number of magnetic poles of the rotor 10 (the number of magnetic poles aligned in circumferential direction in each of magnets 12 and 13) is 2m×n (m and n are natural numbers). In the present embodiment, m=2 and n=4. Thus, the number of magnetic poles of the rotor 10 is eight. Further, each of the magnets 12 and 13 may be configured as an annular integrated magnet or may include a plurality of magnets individually separated for each magnetic pole.

Figure 3A:
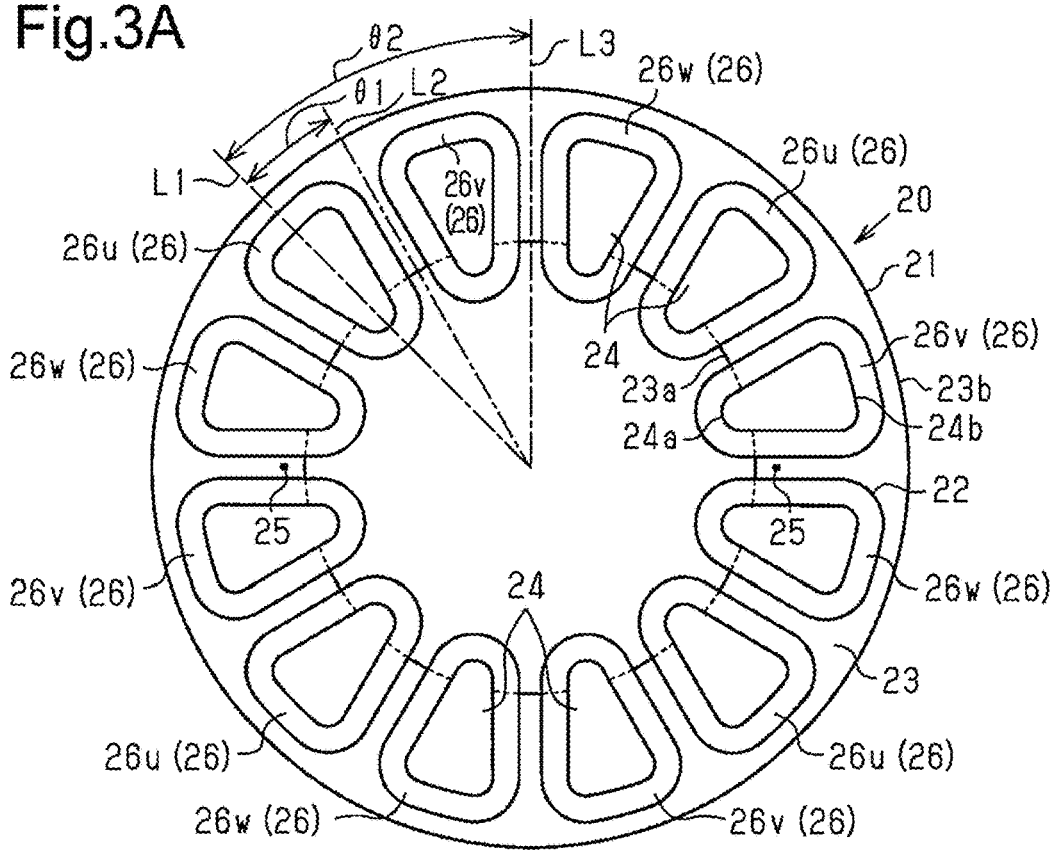
FIG. 3A is a plan view of a first stator of FIG. 1.

As illustrated in FIG. 3A, the first stator 20 includes a first stator core 21 and a first coil group 22 wound around the first stator core 21.

The first stator core 21 includes a first base portion 23 having an annular plate shape and functioning as a back yoke and twelve first teeth 24 protruding in the axial direction (extending in axial direction) from the first base portion 23 toward the rotor 10. The first stator core 21 is manufactured by lamination of electromagnetic steel plates, a soft magnetic powder core, or a combination thereof. The twelve first teeth 24 are provided at equiangular intervals (at intervals of 30° in the present embodiment) in the circumferential direction. The first teeth 24 have a substantially sectoral shape as viewed from the axial direction and have a columnar shape protruding at a predetermined height in the axial direction. The twelve first teeth 24 all have the same shape. In addition, the first teeth 24 adjacent to each other in the circumferential direction are spaced apart by a gap in the circumferential direction. The gap defines a first slot 25. The first slots 25 have the same width in the radial direction.

Figure 5A:
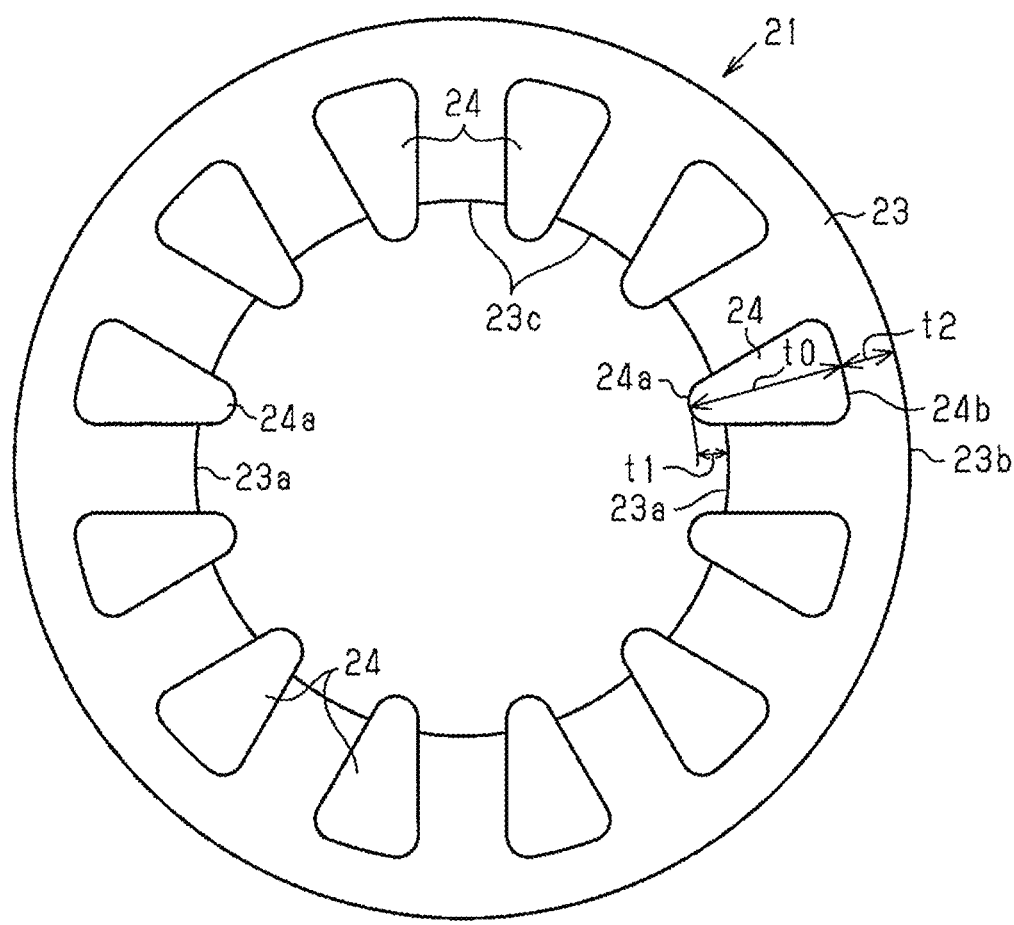
FIG. 5A is a plan view of a stator core of FIG. 1.
Figure 5B:
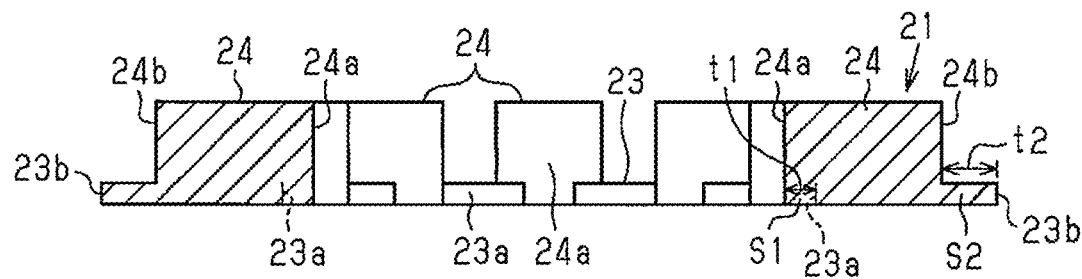
FIG. 5B is a radial sectional view of the stator core of FIG. 1.
Figure 6A:
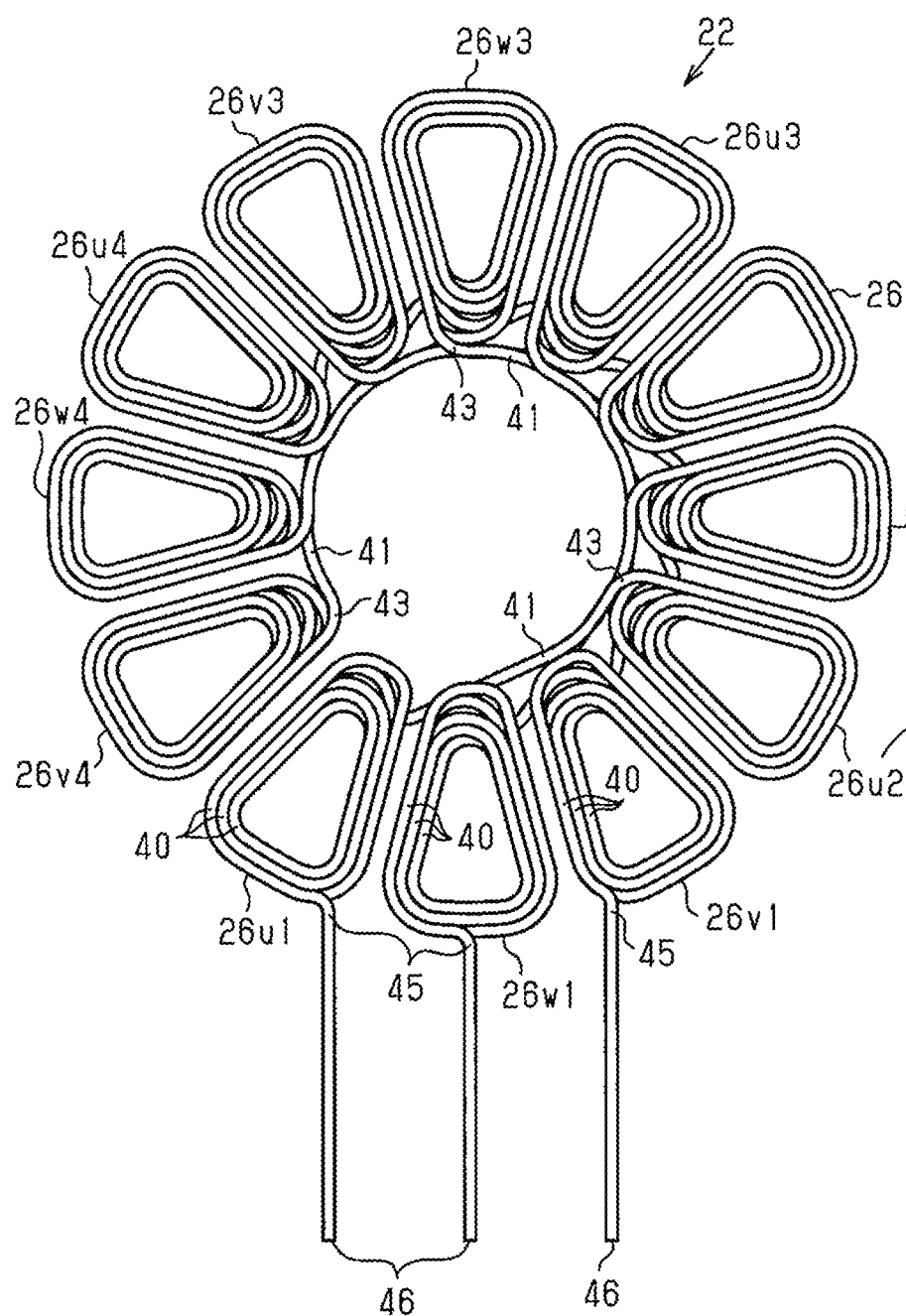
FIG. 6A is a plan view of a coil group of FIG. 1.
Figure 6B:
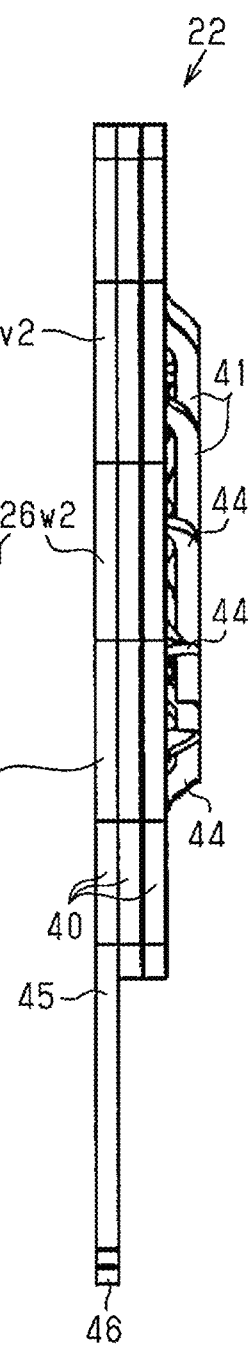
FIG. 6B is a side view of the coil group of FIG. 1.
Figure 8A:
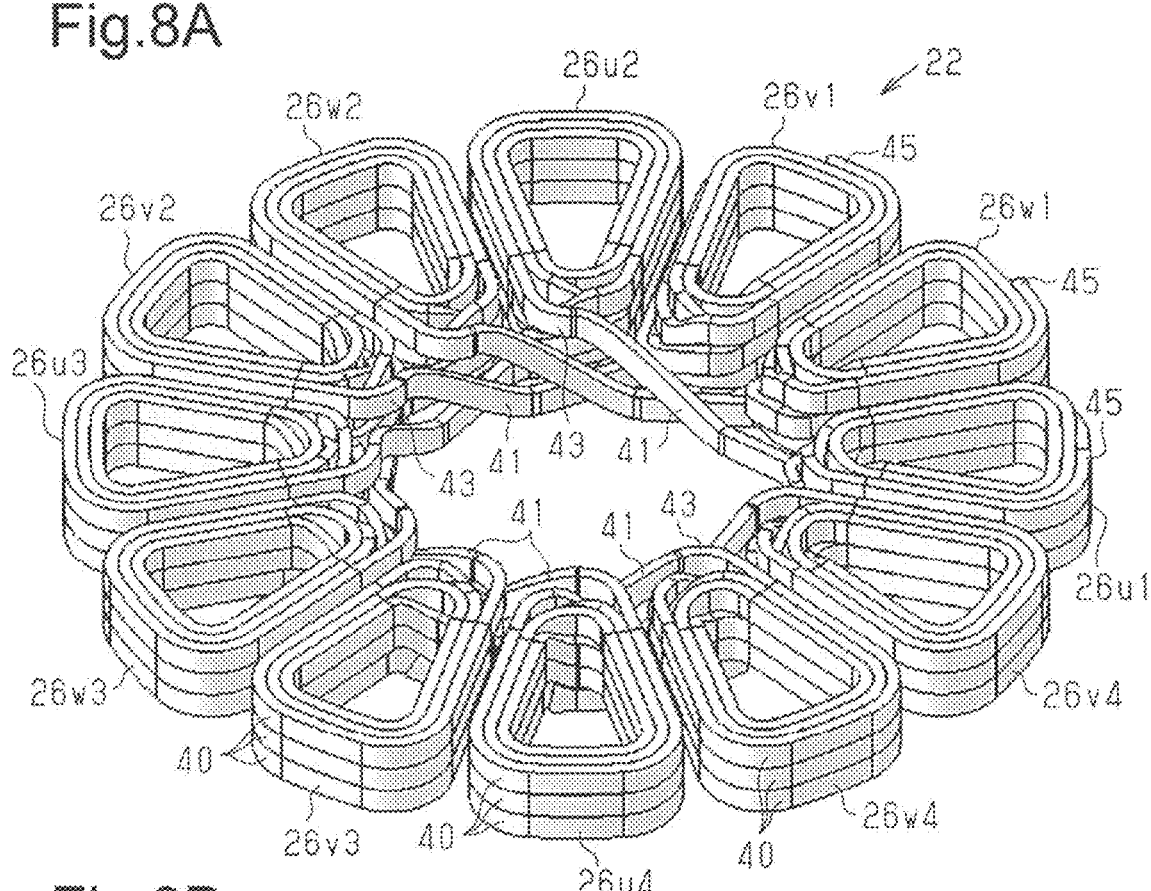
FIG. 8A is a perspective view of the coil group of FIG. 1.
Figure 8B:
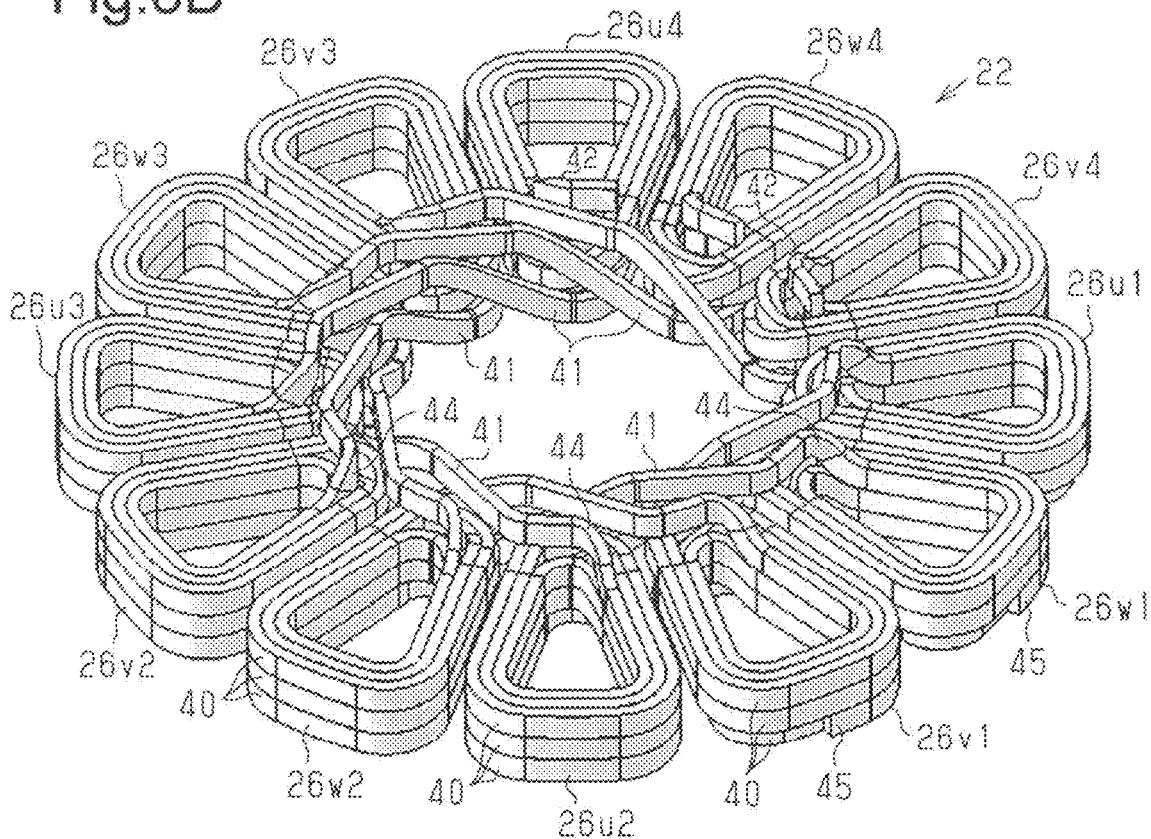
FIG. 8B is a perspective view of a bottom side of the coil group of FIG. 8A.

In addition, as illustrated in FIGS. 5A and 5B, the first base portion 23 of the first stator core 21 of the present embodiment has an inner circumferential edge 23 recessed radially outward from an inner end 24a of each of the first teeth 24. A portion of the inner end 24a of each of the first teeth 24 protruding from the inner circumferential edge 23a of the first base portion 23 axially extends to a rear surface side of the first base portion 23 and is flush with the rear surface. The first base portion 23 has an outer circumferential edge 23b that is sufficiently larger than an outer end 24b of each of the first teeth 24 and is located at a radially outer side of the outer end of the first coil group 22 (first coil 26) in an installed state.

In this case, an extension dimension t2 (radial dimension) that is from the outer end 24b of each of the first teeth 24 to the outer circumferential edge 23b of the first base portion 23 is set to be greater than a recession dimension t1 (radial dimension) that is from the inner end 24a of each of the first teeth 24 to the inner circumferential edge 23a of the first base portion 23. Specifically, the extension dimension t2 from the outer end 24b of each of the first teeth 24 to the outer circumferential edge 23b of the first base portion 23 is set to about two-fifths of a radial dimension t0 of each of the first teeth 24. The recession dimension t1 from the inner end 24a of each of the first teeth 24 to the inner circumferential edge 23a of the first base portion 23 is set to about one-fifth of the radial dimension t0 of each of the first teeth 24 (about the same size as width-wise dimension of flat wire 40, which will be described later).

The first base portion 23 has a thickness (dimension in axial direction) that is constant in the radial direction. Thus, a cross-sectional area S2 of the part of the base portion 23 extending from the outer end 24b of each of the first teeth 24 to the outer circumferential edge 23b of the first base portion 23 is set to be larger than a cross-sectional area S1 (area of cross section extending along axial direction and radial direction) of a recessed portion from the inner end 24a of each of the first teeth 24 to the inner circumferential edge 23a of the first base portion 23, that is, a cutaway part of the inner circumferential portion of the first base portion 23 between the inner ends 24a of adjacent ones of the first teeth 24. A cutaway shape in the inner portion of the first base portion 23 between the inner ends 24a of adjacent ones of the first teeth 24 may decrease a magnetic path. In this regard, the outer circumferential portion of the first base portion 23 sufficiently extends outward to prevent a decrease in magnetic path (increase in magnetic resistance). In addition, the inner cutaway portion of the first base portion 23 is effectively used as an installation space for a part of the first coil group 22.

As illustrated in FIG. 3A, the first coil group 22 includes twelve first coils 26 wound around the respective first teeth 24 by concentrated winding. The twelve first coils 26 of the present embodiment include three-phase coils of U-phase, V-phase, and W-phase and are all wound in the same direction.

Among the twelve first coils 26, four of the first coils 26 provided at positions corresponding to equiangular intervals (at intervals of 90° in the present embodiment) in the circumferential direction are first U-phase coils 26u. Among the remaining eight first coils 26, four of the first coils 26 provided at positions corresponding to equiangular intervals (at intervals of 90° in the present embodiment) in the circumferential direction are first V-phase coils 26v. The remaining four first coils 26 are first W-phase coils 26w provided at positions corresponding to equiangular intervals (at intervals of 90° in the present embodiment) in the circumferential direction. In the present embodiment, when the first stator 20 is viewed from a distal end side of the first teeth 24 (i.e., state illustrated in FIG. 3A), the twelve first coils 26 are repeatedly arranged in the circumferential direction in the order of a first U-phase coil 26u, a first V-phase coil 26v, and a first W-phase coil 26w in a clockwise direction. As described above, the first coil group 22 of the present embodiment includes three-phase coils 26 of U-phase, V-phase, and W-phase.

In addition, as illustrated in FIGS. 6A, 6B, 7A, 7B, 8A, 8B, 9, 10A, and 10B, the first coil group 22 (first coils 26) of the present embodiment is configured using the flat wire 40 having a flat rectangular cross section.

Each of the four first U-phase coils 26u, the four first V-phase coils 26v, and the four first W-phase coils 26w is continuously formed using one flat wire 40. In addition, each of the first U-phase coils 26u, the first V-phase coils 26v, and the first W-phase coils 26w is not directly wound around the first teeth 24. The coils of each phase are manufactured by winding on a jig corresponding to the first teeth 24. The coils 26u, 26v, and 26w of the respective phases are combined together and coupled to the first teeth 24 (first stator core 21). The first U-phase coils 26u, the first V-phase coils 26v, and the first W-phase coils 26w have similar winding modes. Thus, with regard to a specific winding mode, the winding mode of the first U-phase coils 26u will be mainly described.

Figure 9:
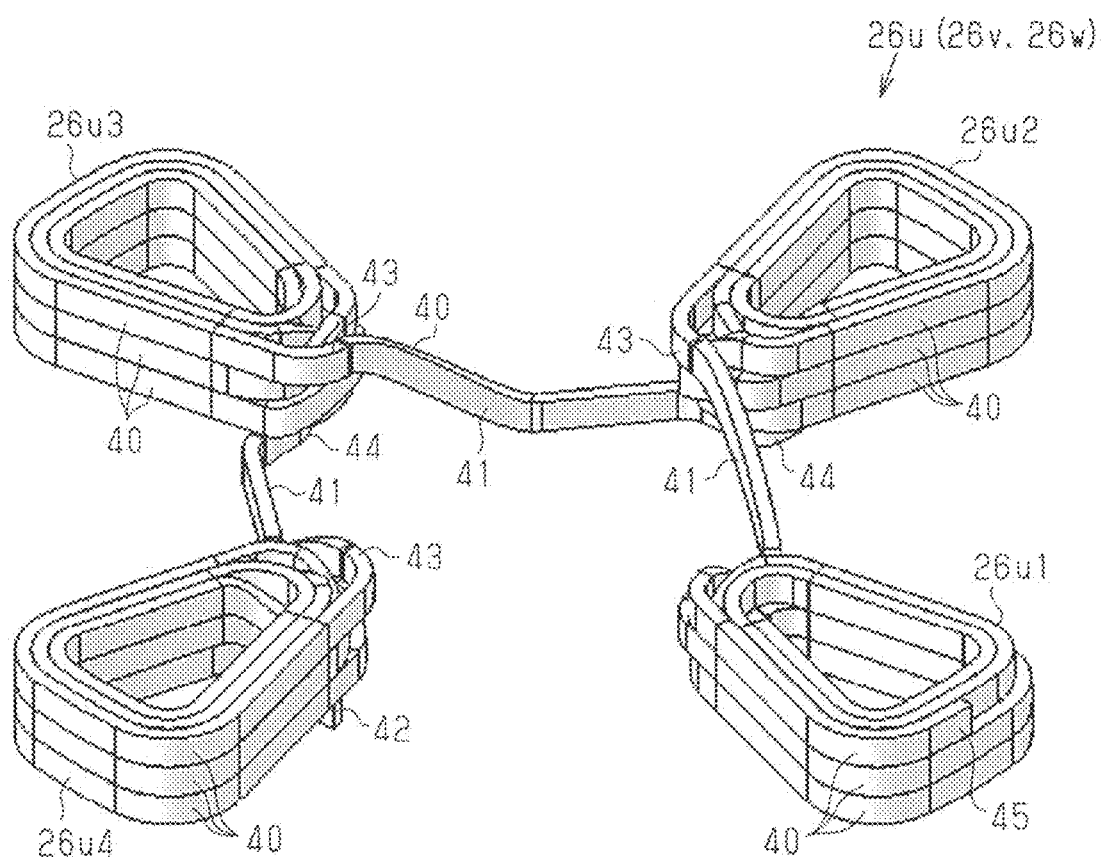
FIG. 9 is a perspective view illustrating a coil of one phase of FIG. 8A.
Figure 10A:
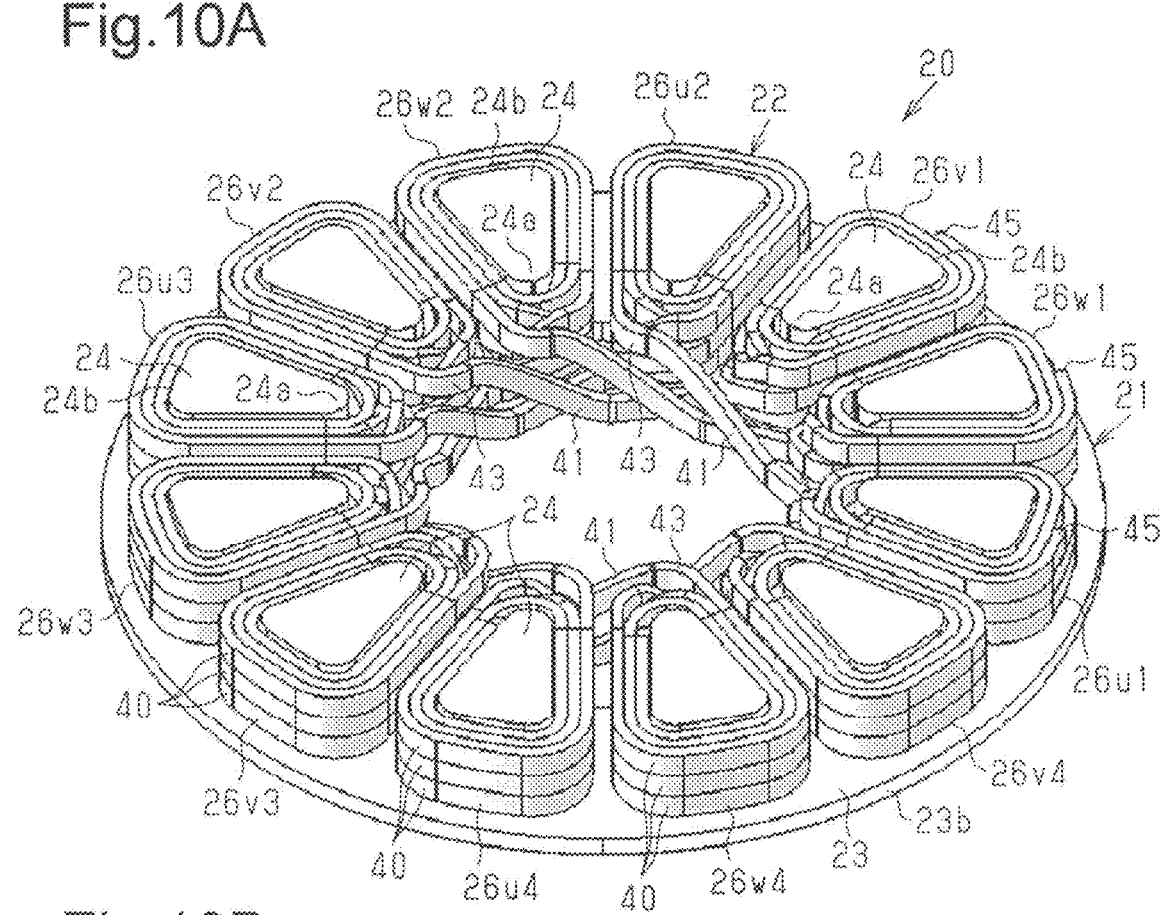
FIG. 10A is a perspective view of a stator of FIG. 1.
Figure 10B:
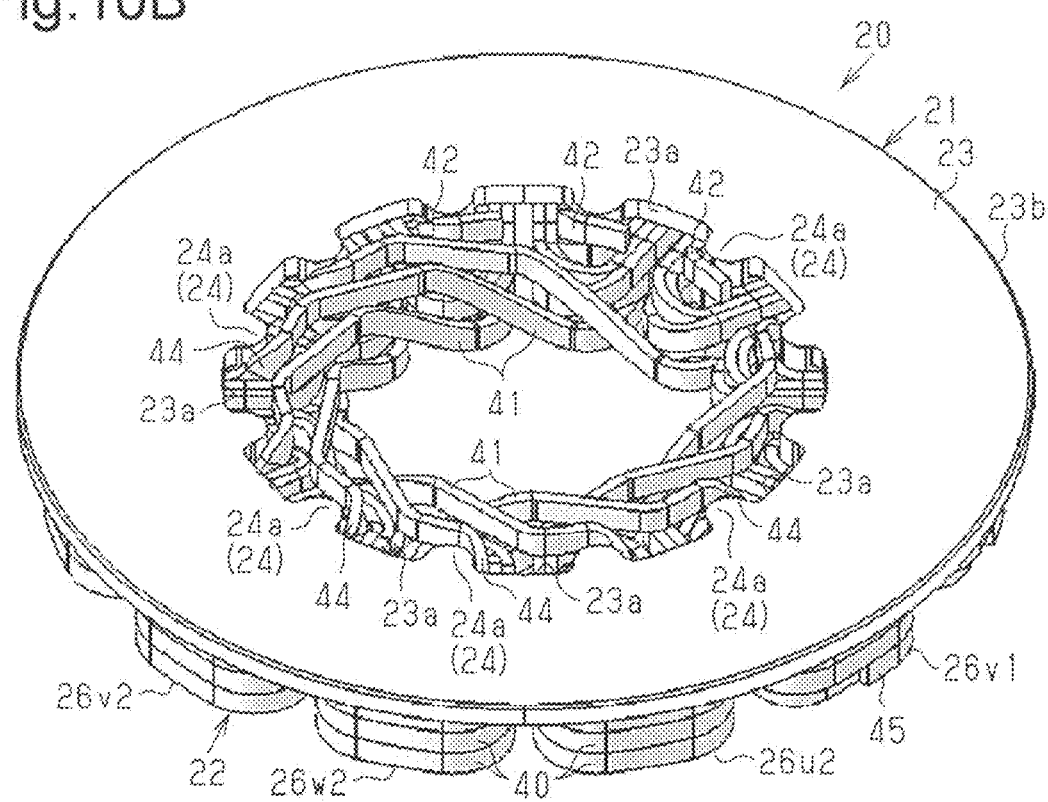
FIG. 10B is a perspective view of a bottom side of the stator of FIG. 10A.

The first U-phase coils 26u have four coil portions, namely, a U-phase first coil portion 26u1, a U-phase second coil portion 26u2, a U-phase third coil portion 26u3, and a U-phase fourth coil portion 26u4 and are configured by one flat wire 40 in which adjacent ones of the coil portions are connected by a connecting wire 41 (see FIG. 9). As a winding procedure by the one flat wire 40, firstly, winding of the U-phase fourth coil portion 26u4 is performed, and then the connecting wire 41 is formed to form the U-phase third coil portion 26u3 clockwise 90° adjacent thereto. Subsequently, winding of the U-phase third coil portion 26u3 is performed, and then the connecting wire 41 is formed to form the U-phase second coil portion 26u2 clockwise 90° adjacent thereto. Subsequently, winding of the U-phase second coil portion 26u2 is performed, and then the connecting wire 41 is formed to form the U-phase first coil portion 26u1 clockwise 90° adjacent thereto. Then, winding of the U-phase first coil portion 26u1 is performed.

Further, a specific winding mode of each of the coil portions 26u1, 26u2, 26u3, and 26u4 will be described as a state mounted on the first teeth 24. Firstly, in the U-phase fourth coil portion 26u4, a winding start end 42 of the flat wire 40 is raised upward from below a side surface of the inner end 24a of the first tooth 24 (see FIG. 10B), bent in a horizontal direction at a protruding proximal end portion of the tooth 24, and wound in a shape along a protruding proximal end peripheral surface of the tooth 24. When the flat wire 40 is wound, the direction in which the flat wire 40 extends (longitudinal direction of flat wire 40) corresponds to a surrounding direction of a peripheral surface of the tooth 24. The width-wise direction of the flat wire 40 corresponds to a protruding direction (axial direction) of the tooth 24. The thickness (smaller than width-wise dimension) direction of the flat wire 40 corresponds to a direction orthogonal to the protruding direction of the tooth 24. The flat wire 40 is wound around the tooth 24 three times such that three tiers are stacked from a protruding proximal end to a protruding distal end of the tooth 24, that is, from a lower position to an upper position.

Then, the flat wire 40 in a second layer is wound to lap on the outside of the flat wire 40 in a first layer wound as described above. The flat wire 40 wound in the second layer is wound around the tooth 24 three times again such that three tiers are stacked from the protruding distal end to the protruding proximal end of the tooth 24, that is, from the upper side to the lower side. The flat wire 40 in a third layer is wound to lap on the outside of the flat wire 40 in the second layer wound as described above. The flat wire 40 wound in the third layer is wound around the tooth 24 three times again such that three tiers are stacked from the protruding proximal end to the protruding distal end of the tooth 24, that is, from the lower side to the upper side.

The flat wire 40 has a winding terminated portion 43 of the U-phase fourth coil portion 26u4 at the protruding distal end of the tooth 24 (see FIG. 10A), and a connecting wire 41 is formed therefrom toward the winding position of the U-phase third coil portion 26u3, which is adjacent thereto at 90°. The connecting wire 41 is bent obliquely downward in the width-wise direction of the flat wire 40 from the winding terminated portion 43 of the U-phase fourth coil portion 26u4 located at the protruding distal end of the tooth 24 and also bent in the thickness-wise direction along the inner circumferential edge 23a of the base portion 23. The connecting wire 41 is inclined toward a winding start portion 44 of the coil portion 26u3 at a position one tier lower than three tiers of the subsequently wound U-phase third coil portion 26u3 in a vertical direction (axial direction). In this case, the connecting wire 41 is inclined obliquely downward to a position equivalent to the base portion 23 further below the proximal end of the tooth 24. In other words, a part of the connecting wire 41 protrudes downward from the coil portion 26u3 by about the width of the connecting wire 41

(flat wire 40) (see FIGS. 6A to 7B). In this case, the part of the connecting wire 41 does not protrude from the rear surface of the base portion 23 or slightly protrudes therefrom (see FIG. 10B).

Subsequently, at the winding start portion 44 of the U-phase third coil portion 26u3, the distal end of the connecting wire 41 is raised upward from below the side surface of the inner end 24a of the corresponding tooth 24. The flat wire 40 is bent at the protruding proximal end portion of the tooth 24 in the horizontal direction and sequentially wound from the protruding proximal end. The U-phase third coil portion 26u3 is wound in the same manner as the U-phase fourth coil portion 26u4. Further, therefrom, a connecting wire 41 is formed, the U-phase second coil portion 26u2 is wound, a connecting wire 41 is formed, and finally the U-phase first coil portion 26u1 is wound. After the winding of the U-phase first coil portion 26u1A is completed, a winding termination end 45 of the flat wire 40 is drawn to a radially outer side of the first stator core 21 and serves as a feeding point 46 (see FIGS. 6A to 7B; the other drawings do not show draw-out to radially outer side).

As described above, the first U-phase coil 26u having the U-phase first coil portion 26u1, the U-phase second coil portion 26u2, the U-phase third coil portion 26u3, and the U-phase fourth coil portion 26u4 is formed by one flat wire 40. In addition, in the same manner, the first V-phase coil 26v having the V-phase first coil portion 26v1, the V-phase second coil portion 26v2, the V-phase third coil portion 26v3, and the V-phase fourth coil portion 26v4 is formed by one flat wire 40. Also, the first W-phase coil 26v having the W-phase first coil portion 26w1, the W-phase second coil portion 26w2, the W-phase third coil portion 26w3, and the W-phase fourth coil portion 26w4 is formed in the same manner.

The winding start ends 42 of the flat wires 40 of the first U-phase coil 26u, the first V-phase coil 26v, and the first W-phase coil 26w are connected to each other to form a neutral point 47 when the first U-phase coil 26u, the first V-phase coil 26v, and the first W-phase coil 26w serve as the first coil group 22 (see FIG. 7A; the other drawings do not show connection as neutral point). More specifically, the first U-phase coil 26u, the first V-phase coil 26v, and the first W-phase coil 26w have a connection mode of Y-connection (star connection). The first coil group 22 configured as described above is integrally formed and then coupled to the first stator core 21 (first teeth 24).

As illustrated in FIGS. 1, 2, 3A, and 3B, the second stator 30 has the same configuration as that of the first stator 20. More specifically, the second stator 30 includes a second stator core 31 having the same shape as that of the first stator core 21 and a second coil group 32 wound around the second stator core 31.

The second stator core 31 includes a second base portion 33 having an annular plate shape in the same manner as the first base portion 23 and functioning as a back yoke and twelve second teeth 34 protruding in the axial direction (extending in axial direction) from the second base portion 33 toward the rotor 10. In the same manner as the first stator core 21, the second stator core 31 is manufactured by lamination of electromagnetic steel plates, a soft magnetic powder core, or a combination thereof. In addition, the twelve second teeth 34 have the same shape as that of the first teeth 24 and are provided at equiangular intervals (at intervals of 30° in the present embodiment) in the circumferential direction. In addition, a gap between adjacent ones of the second teeth 34 corresponds to a second slot 35. The second slots 35 have the same width in the radial direction.

With regard to the second stator core 31, in the same manner as the first stator core 21, each of the second teeth 34 has an inner portion protruding inward from the second base portion 33. A protrusion length (t2) that is from an outer end 34b of each of the second teeth 34 to an outer circumferential edge 33b of the second base portion 33 is set to be greater than a protrusion length (t1) that is from an inner circumferential edge 33a of the second base portion 33 to an inner end 34a of each of the second teeth 34.

The second coil group 32 includes twelve second coils 36 wound around the respective second teeth 34 by concentrated winding. The twelve second coils 36 of the present embodiment include three-phase coils of U-phase, V-phase, and W-phase and are all wound in the same direction. In addition, the winding direction of the second coils 36 viewed from a distal end side (one axial side) of the second teeth 34 is the same as the winding direction of the first coils 26 viewed from a distal end side (one axial side) of the first teeth 24.

Among the twelve second coils 36 are second U-phase coils 36u, four of the second coils 36 provided at positions corresponding to equiangular intervals (at intervals of 90° in the present embodiment) in the circumferential direction are second U-phase coils 36u. Among the remaining eight second coils 36, four of the second coils 36 provided at positions corresponding to equiangular intervals (at intervals of 90° in the present embodiment) in the circumferential direction are second V-phase coils 36v. The remaining four second coils 36 are second W-phase coils 36w provided at positions corresponding to equiangular intervals (at intervals of 90° in the present embodiment) in the circumferential direction. That is, the second coil group 32 of the present embodiment includes three-phase coils of U-phase, V-phase, and W-phase. In the present embodiment, when the second stator 30 is viewed from a distal end side of the second teeth 34 (i.e., state illustrated in FIG. 3B), the twelve second coils 36 are repeatedly arranged in the circumferential direction in the order of a second U-phase coil 36u, a second V-phase coil 36v, and a second W-phase coil 36w in a counterclockwise direction. Therefore, the three-phase coils 26u, 26v, and 26w of the first coil group 22 of the first stator 20 and the three-phase coils 36u, 36v, and 36w of the second coil group 32 of the second stator 30 have the same arrangement order in the circumferential direction as viewed from one axial side.

In the same manner as the first coil 26, the second coil 36 uses a flat wire 40 having a flat rectangular cross section (see, for example, FIG. 9). A specific winding mode of the second coil group 32 (second coil 36) is the same as that of the first coil group 22 (first coil 26), and description and illustration thereof are omitted.

As illustrated in FIGS. 1 and 2, the first stator 20 is disposed at the side of the first magnet 12 with respect to the rotor 10, and each of the first teeth 24 has a distal end surface (axial end surface) facing the first magnet 12 in the axial direction. The second stator 30 is disposed at the side of the second magnet 13 with respect to the rotor 10, and each of the second teeth 34 has a distal end surface (an axial end surface) facing the second magnet 13 in the axial direction. Slight gaps are provided between the first stator 20 and the rotor 10 facing each other in the axial direction and between the second stator 30 and the rotor 10 facing each other in the axial direction. The first base portion 23 of the first stator core 21, the second base portion 33 of the second stator core 31, and the rotor core 11 extend in a direction orthogonal to the axial direction and are parallel to each other. Additionally, center axes of the first and second stators 20 and 30 and the rotor 10 coincide with each other. The first stator 20 and the second stator 30 are accommodated in a motor housing (not illustrated) and fixed to the motor housing.

As illustrated in FIGS. 2, 3A, 3B, and 4, circumferential positions of the first coil group 22 of the first stator 20 and the second coil group 32 of the second stator 30 are relatively shifted.

More specifically, the first coil group 22 and the second coil group 32 are relatively shifted from each other by a mechanical angle $((360/3n)/2)°$ in the circumferential direction ("3n" is the number of slots in each of stators 20 and 30). When $((360/3n)/2)°$ is set as a first shift angle $\theta 1$ where n=4 in the present embodiment, the first shift angle $\theta 1$ is 15°. Thus, the first coil group 22 and the second coil group 32 are relatively shifted from each other by a mechanical angle of 15° (angle between reference line L1 and reference line L2) in the circumferential direction. In the present embodiment, the first coil group 22 and the second coil group 32 are relatively shifted in the circumferential direction by half of the first coil 26 (or second coil 36). Thus, circumferential positions of the twelve first teeth 24 are the same as circumferential positions of twelve second slots 35.

Figure 3B:
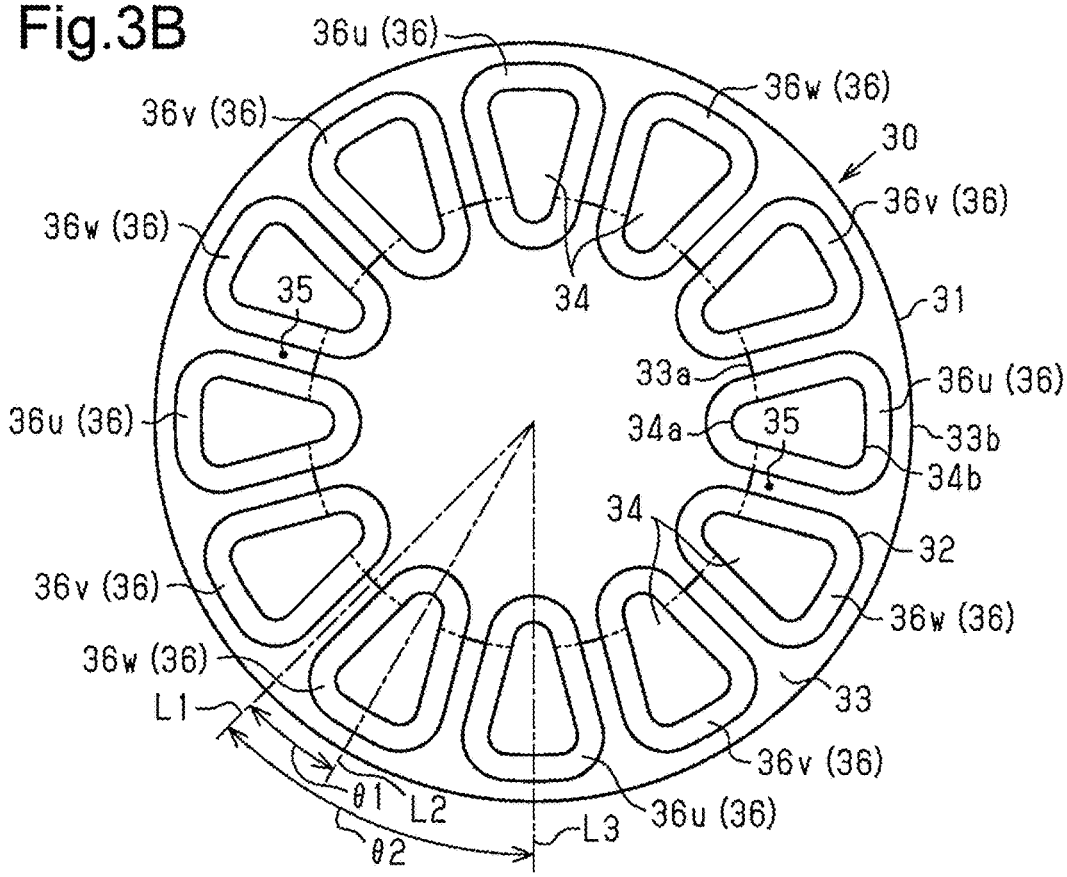
FIG. 3B is a plan view of a second stator of FIG. 1.

Further, in the first coil group 22 and the second coil group 32, the coils 26 and 36 of the same phase are relatively shifted by a mechanical angle of $((360/(2m \times n)) \times m)°$ in the circumferential direction ("2m×n" is the number of magnetic poles in each of magnets 12 and 13). The mechanical angle of $((360/(2m \times n)) \times m)°$ is set as a second shift angle $\theta 2$ where m=1 and n=4 in the present embodiment. Thus, the second shift angle $\theta 2$ is 45°. Therefore, in the first coil group 22 and the second coil group 32, the coils of the same phase (namely, first U-phase coil 26u and second U-phase coil 36u, first V-phase coil 26v and second V-phase coil 36v, and first W-phase coil 26w and second W-phase coil 36w) are relatively shifted by the mechanical angle of 45° in the circumferential direction. For example, with respect to the first U-phase coil 26u illustrated at an upper left in FIG. 3A, the second U-phase coil 36u illustrated at a lower center in FIG. 3B is shifted in the circumferential direction by 45° between the reference line L1 and a reference line L3. Further, one of the second U-phase coils 36u is located in the middle between each two of the first U-phase coils 26u adjacent to each other in the circumferential direction.

Figure 4:
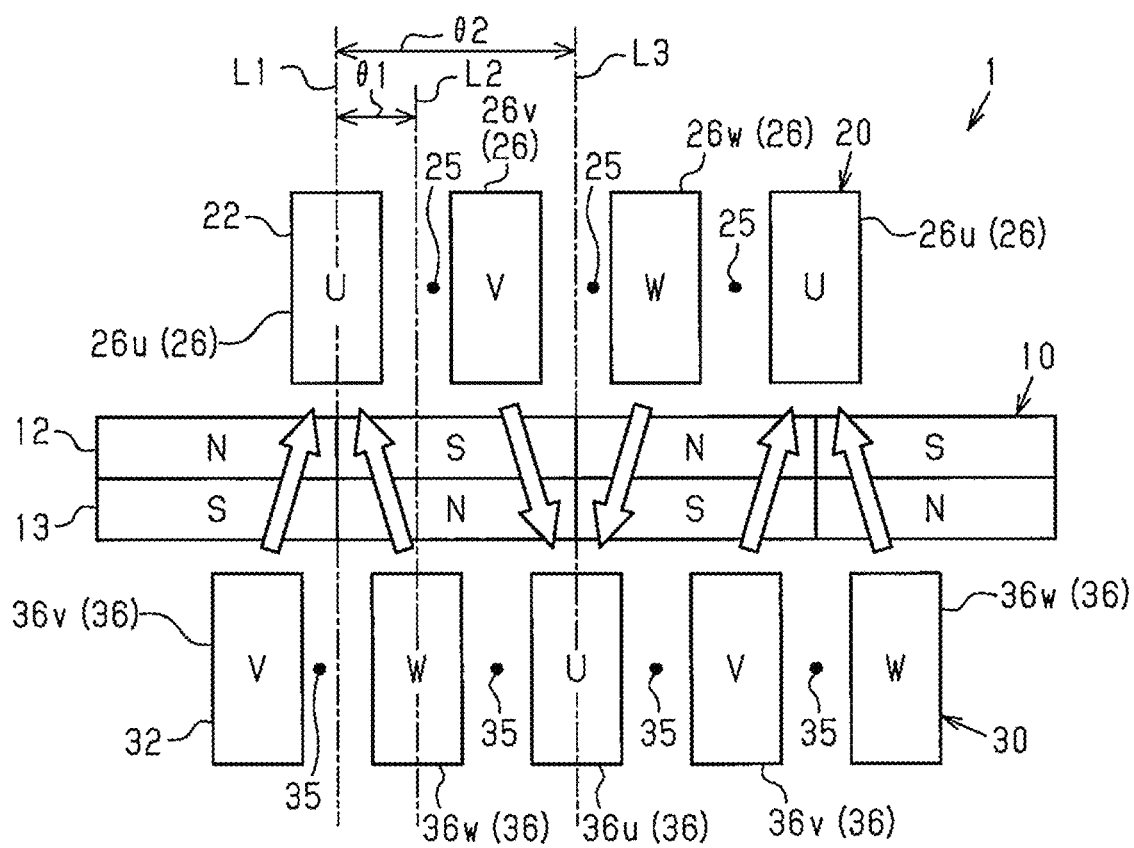
FIG. 4 is a schematic view in which a part of the brushless motor of FIG. 1 is laid out in a planar shape.

As illustrated in FIG. 4, in the brushless motor 1 having such a configuration, the rotor 10 is rotationally driven in accordance with a rotating magnetic field generated in the first stator 20 and the second stator 30 by energization of the first coil 26 and the second coil 36. The phases of a U-phase alternating current supplied to the first U-phase coil 26u, a V-phase alternating current supplied to the first V-phase coil 26v, and a W-phase alternating current supplied to the first W-phase coil are shifted from each other. In the same manner, the phases of a U-phase alternating current supplied to the second U-phase coil 36u, a V-phase alternating current supplied to the second V-phase coil 36v, and a W-phase alternating current supplied to the second W-phase coil are shifted from each other.

Circumferential positions of the first coil group 22 and the second coil group 32 are relatively shifted. More specifically, the first coil group 22 and the second coil group 32 are relatively shifted from each other by a mechanical angle of the first shift angle $\theta 1$ (15° in the present embodiment) in the circumferential direction. In the first coil group 22 and the second coil group 32, the coils of the same phase (namely, first U-phase coil 26u and second U-phase coil 36u, first V-phase coil 26v and second V-phase coil 36v, and first W-phase coil 26w and second W-phase coil 36w) are relatively shifted from each other by a mechanical angle of the second shift angle $\theta 2$ (45° in the present embodiment) in the circumferential direction.

Therefore, each of the first coils 26 of the first stator 20 is faced in the axial direction to two of the second coils 36 of the second stator 30 that are adjacent to each other in the circumferential direction. In the same manner, each of the second coils 36 of the second stator 30 is faced in the axial direction to two of the first coils 26 of the first stator 20 adjacent to each other in the circumferential direction. Thus, in the first stator 20 and the second stator 30, magnetic flux flows through one of the coils of one stator and two coils of the other stator facing the one coil in the axial direction.

For example, magnetic flux flows through each first U-phase coil 26u that has the south pole of the first stator 20 and the second V-phase coil 36v and the second W-phase coil 36w that face the first U-phase coil 26u in the axial direction and have the north pole of the second stator 30. FIG. 4 illustrates a state in which magnetic flux is maximized in the first U-phase coil 26u and the second U-phase coil 36u by energization of the coils 26 and 36 with arrows indicating flow of the magnetic flux in the first and second stators 20 and 30. In the present embodiment, in the state illustrated in FIG. 4, the magnetic flux in the second V-phase coil 36v and the magnetic flux in the second W-phase coil 36w each correspond to about one half of the magnetic flux in the first U-phase coil 26u. Also, the magnetic flux in the first V-phase coil 26v and the magnetic flux in the first W-phase coil 26w each correspond to about one half of the magnetic flux in the second U-phase coil 36u.

Thus, the magnetic flux is dispersed (concentration of magnetic flux is limited) as compared to a case in which each coil of one stator faces each coil of the other stator one-to-one in the axial direction, that is, as compared to a case in which magnetic flux flows through one coil of one stator and one coil of the other stator facing the one coil in the axial direction.

The advantageous effects of the present embodiment will be described.

(1) Since the first and second stators 20 and 30 have the same configuration, the first stator 20 will be described below. The first stator 20 includes the stator core 21 having a shape in which the inner circumferential edge 23a of the base portion 23 is recessed radially outward from the inner end 24a of each of the teeth 24. A part of the flat wire 40 (connecting wire 41) included in the coil 26 is disposed in a recessed portion of the base portion 23 (cutaway portion 23c (see FIG. 5A)). This increases the degree of freedom for arranging the flat wire 40, which is one of the motor components, and allows the flat wire 40 to be efficiently disposed. As a result, miniaturization of the stator 20, ultimately, miniaturization of the brushless motor 1 may be achieved.

In addition, the flat wire 40, a bending direction thereof tending to be restricted, is used in the present embodiment. Thus, the increase in the degree of freedom for arranging the flat wire 40 on the stator core 21 has a great effect.

(2) In correspondence with the inner circumferential edge 23a of the base portion 23 having the recession shape, the outer circumferential edge 23b of the base portion 23 has a shape extending radially outward from the outer ends 24b of the teeth 24. Thus, the extension portion compensates for a decrease in the magnetic path of the recessed portion, and an appropriate magnetic path can be ensured in the entire stator core 21.

In particular, in the present embodiment, the extension portion of the outer circumferential edge 23b is longer than or equal to the recessed portion of the inner circumferential edge 23a of the base portion 23. Hence, when the thickness of the base portion 23 is made constant in the radial direction, the cross-sectional area of the base portion 23 in the radial direction is larger than or equal to that in a configuration that does not include the recessed portion and the extension portion. Thus, a further sufficient magnetic path may be ensured.

(3) A part of the connecting wire 41 connecting adjacent coil portions in each phase (for example, between coil portions 26u1 to 26u4) is disposed in the recessed portion of the inner circumferential edge 23a of the base portion 23. The part of the connecting wire 41 protrudes to one axial side of the coil portions 26u1 to 26u4, in this case, a side opposite to the rotor 10. In this manner, the flat wire 40 (connecting wire 41) is efficiently arranged.

The first embodiment described above may be modified as below.

The number of magnetic poles of the rotor 10 is eight, but the number may be other than eight, for example, sixteen. In addition, the magnets 12 and 13 of the rotor 10 may be configured as an annular integrated magnet or may include a plurality of magnets individually separated for each magnetic pole.

The number of the coil magnetic poles of the stators 20 and 30 may be other than 12 poles. In this case, shift angles of the stators 20 and 30 and the like are appropriately changed in relation to the rotor 10.

Figure 11A:
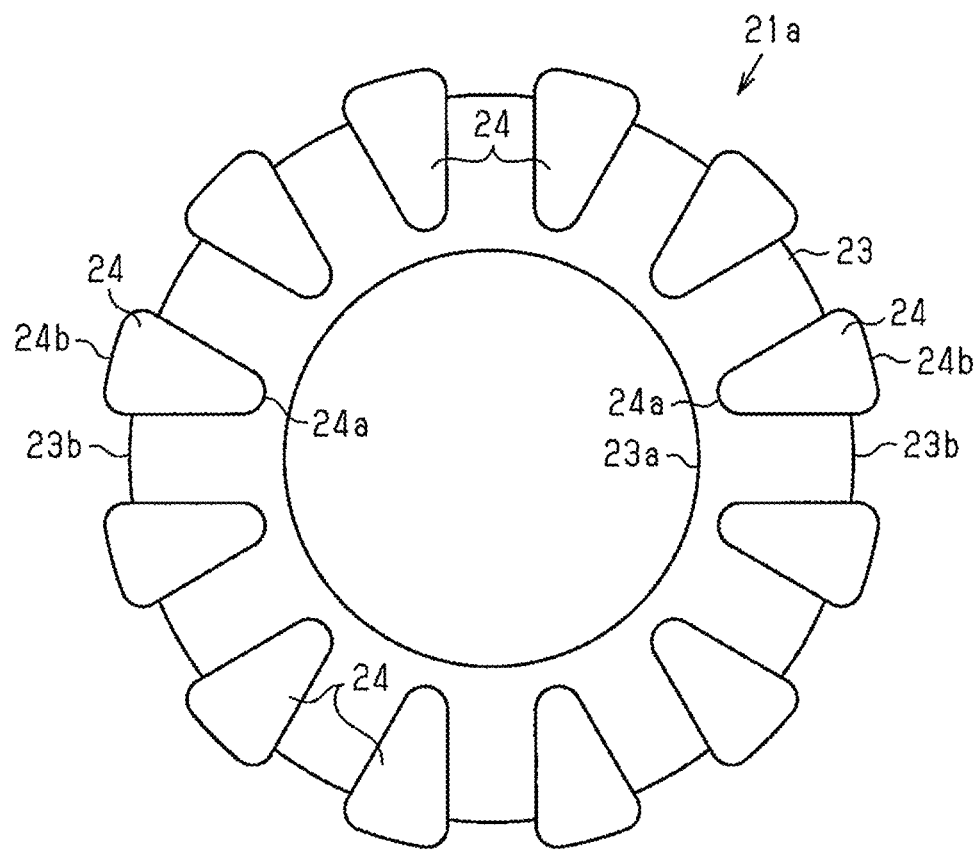
FIG. 11A is a plan view of a stator core in a further example.
Figure 11B:
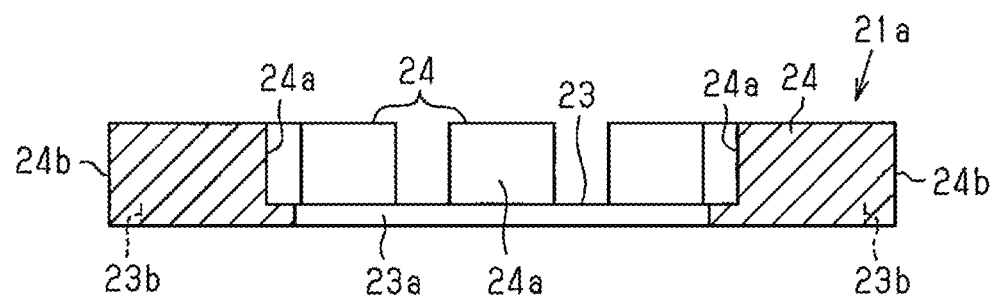
FIG. 11B is a radial sectional view of the stator core in the example of FIG. 11A.

As in the stator core 21a illustrated in FIGS. 11A and 11B, a shape may be employed in which the outer circumferential edge 23b of the base portion 23 is recessed radially inward from the outer end 24b of each of the teeth 24. When the flat wire 40, which is one of the motor components, is disposed in the recessed portion, the flat wire 40 is efficiently disposed. In addition, in correspondence with the outer circumferential edge 23b of the base portion 23 having the recessed shape, the inner circumferential edge 23a of the base portion 23 may have a shape extending radially inward from the inner end 24a of each of the teeth 24. Thus, the extension portion of the inner circumferential edge 23a compensates for a decrease in the magnetic path of the recessed portion of the outer circumferential edge 23b of the base portion 23, and an appropriate magnetic path can be ensured in the entire stator core 21a. As in the above embodiment, the extension dimension of the inner circumferential edge 23a may be greater than or equal to the recession dimension of the outer circumferential edge 23b of the base portion 23.

The stator cores 21 and 31 may be manufactured by lamination of electromagnetic steel plates, a soft magnetic powder core, or a combination thereof.

The present invention is applied to the motor 1 having the two stators 20 and 30 and the rotor 10 (magnets 12 and 13). However, the present invention may be applied to a motor including one stator and a rotor.

A motor component other than the flat wire 40 may be disposed in the recessed portion of the inner circumferential edge 23a of the base portion 23.

The flat wire 40 having a flat rectangular cross section is used as a coil element. Instead, for example, a round wire having a circular cross section may be used.

Figure 12:
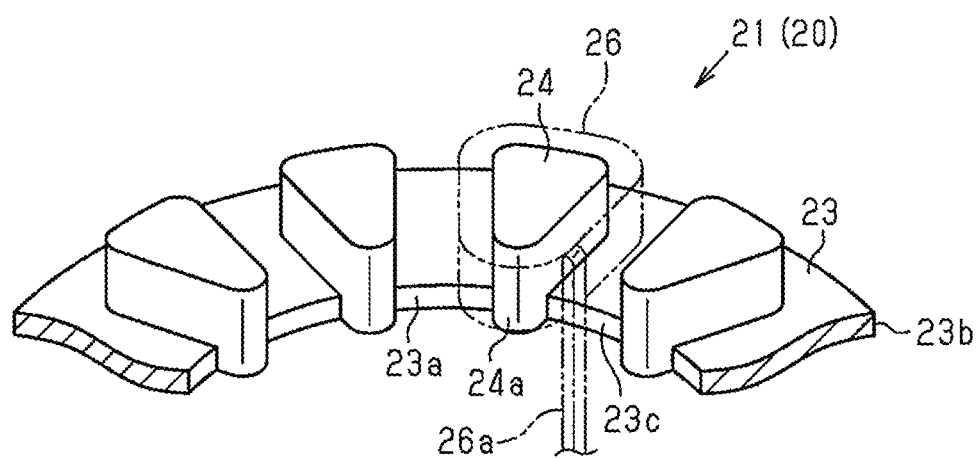
FIG. 12 is a perspective view of a stator core in a further example.

In the above embodiment, the first stator core 21 has the shape in which the inner circumferential edge 23a of the base portion 23 is recessed radially outward from the inner end 24a of each of the teeth 24. As a result, the cutaway portion 23c recessed radially outward (see FIG. 5A) in an inner circumferential portion of the base portion 23 of the first stator core 21 is provided between the inner ends 24a of adjacent ones of the teeth 24. Further, as illustrated in FIG. 12, a draw-out line 26a (at least one of winding start end 42 and winding termination end 45) of the coil element drawn out from the coil 26 may be inserted into the cutaway portion 23c in the axial direction. According to such a configuration, the draw-out line 26a may be accommodated in a body of the first stator core 21 in the radial direction. This limits an increase in size of the brushless motor 1 in the radial direction. In the above description, the first stator core 21 (first stator 20) is described as an example. However, the second stator core 31 (second stator 30) may be changed in the same manner.

FIG. 12 shows a configuration in which the cutaway portion 23c is formed in the inner circumferential portion of the first stator core 21 and is described as an example. However, the configuration is not particularly limited thereto. For example, as in a configuration illustrated in FIG. 11, the example described above may be applied to a configuration in which the outer circumferential edge 23b of the base portion 23 is recessed radially inward from the outer end 24b of each of the teeth 24, thereby having cutaway portions between outer ends 24b of adjacent ones of the teeth 24 in the outer circumferential portion of the first stator core 21. More specifically, the draw-out line 26a of the coil element drawn out from the coil 26 may be inserted into the cutaway portions between the outer ends 24b of adjacent ones of the teeth 24 in the outer circumferential portion of the first stator core 21.

FIG. 13A illustrates a brushless motor 50 including a rotor 10 and two stators 20 and 30 that are substantially the same as those in the above embodiment, a motor case 51 for accommodating the rotor 10 and the stators 20 and 30, and two driving circuits (first driving circuit 52 and second driving circuit 53) provided at opposite sides of the motor case 51 in the axial direction. In the present example, the same reference symbol will be assigned to the same configuration or a corresponding configuration as that of the above embodiment, and a detailed description thereof will be omitted.

The motor case 51 includes a yoke housing 54 having a shape of a cylinder having a wall end and an end frame 55 fixed to the yoke housing 54 to close an open end of the yoke housing 54. The rotating shaft 2 of the rotor 10 is rotatably supported by bearings 56 provided to the yoke housing 54 and the end frame 55, respectively. The rotating shaft 2 extends through the end frame 55 and the first driving circuit 52 in the axial direction and protrudes to the exterior. The protruding portion is configured as an output portion.

Here, a description will be given of stator cores 61 of the first and second stators 20 and 30 in the present example. The stator cores 61 of the first and second stators 20 and 30 have the same shape. Thus, the stator core 61 of the first stator 20 will be described below as an example. In addition, the stator core 61 of the present example is different from the stator core 21 of the above embodiment only in the shape of the base portion 23.

Figure 14:
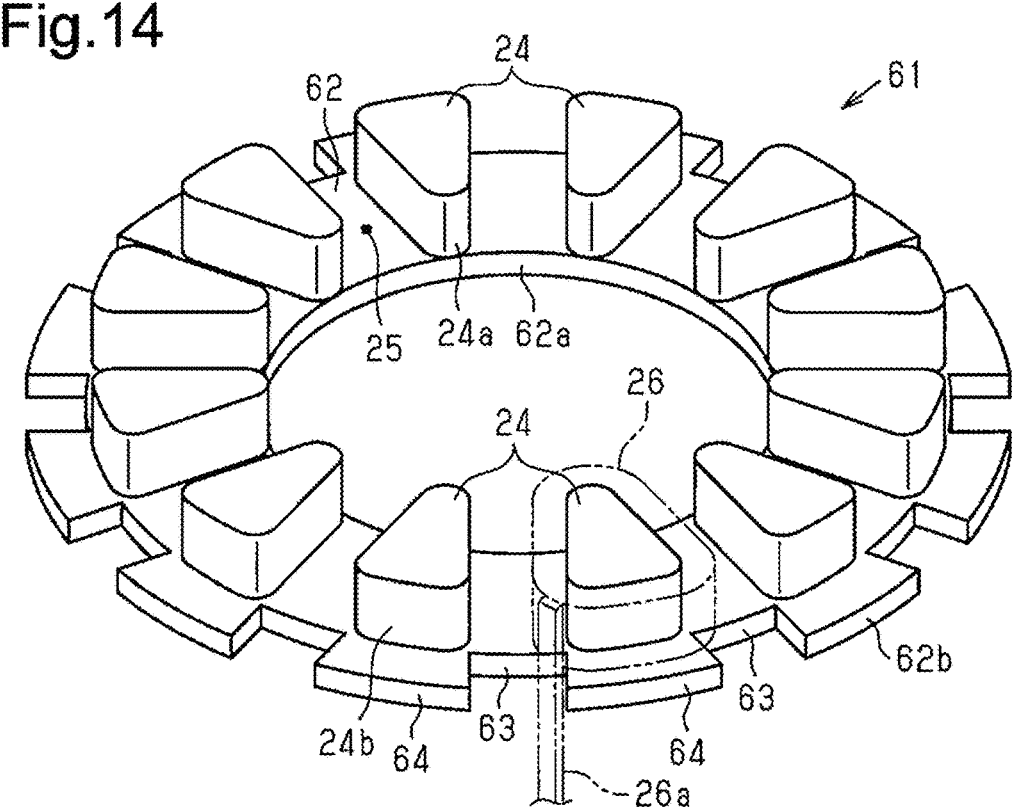
FIG. 14 is a perspective view of a stator core in the example of FIG. 13.

As illustrated in FIG. 14, an inner circumferential edge 62a of a base portion 62 of the stator core 61 in the present example has a circular shape, the center of which corresponds to an axis of the rotating shaft 2, and is configured to be aligned with an inner end 24a of each of the teeth 24 in the axial direction. In addition, an outer circumferential edge 62b of the base portion 62 has a circular shape, the center of which corresponds to the axis of the rotating shaft 2. The diameter (outer diameter of base portion 62) of the outer circumferential edge 62b is set to be larger than the diameter of the outer ends 24b of the teeth 24. Further, the outer circumferential edge 62b of the base portion 62 includes a plurality of cutaway portions 63 arranged at intervals in the circumferential direction. In the present example, the number of cutaway portions 63 is set to be equal to the number of slots 25 (i.e., the number of teeth 24). In addition, the cutaway portions 63 are provided at a radially outer side of the slots 25 and have the same width as the slots 25 in the circumferential direction.

In addition, parts of the outer circumferential edge 62b of the base portion 62 between adjacent ones of the cutaway portions 63 in the circumferential direction (parts that do not include cutaway portions 63) define projections 64 protruding outward in the radial direction. Each projection 64 is provided at a radially outer side of the teeth 24. In addition, opposite side surfaces of each of the teeth 24 in the circumferential direction are aligned with opposite end portions of the projection 64 in the circumferential direction, located at a radially outer side of the tooth 24, as viewed in the axial direction. In the radial direction, an outer end of each projection 64 (outer circumferential edge 62b of base portion 62) is located at an outer side of an outer end of the coil 26 in an installed state.

Figure 13:
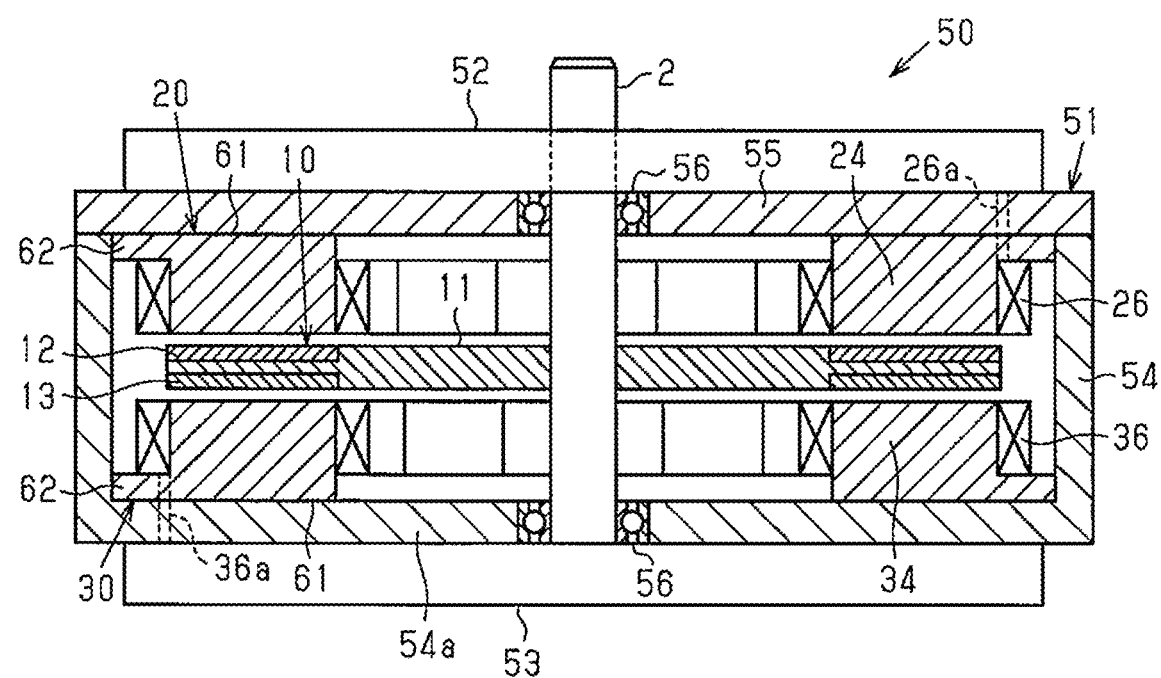
FIG. 13 is a cross-sectional view of a brushless motor in a further example.

As illustrated in FIG. 13, the first driving circuit 52 is fixed to an axial outer surface of the end frame 55. In addition, the second driving circuit 53 is fixed to an axial outer surface of a bottom portion 54a of the yoke housing 54.

The draw-out line 26a, which is an end of a coil element included in the coil 26 (at least one of winding start end 42 and winding termination end 45), is drawn out in the axial direction from some of the coils 26 of the first stator 20. In the first stator 20, the draw-out line 26a is drawn out to a rear surface side of the base portion 62 (side opposite to the teeth 24) through the cutaway portion 63 of the stator core 61. Further, the draw-out line 26a is drawn through an insertion hole (not illustrated) formed in the end frame 55 out of the motor case 51 and connected to the first driving circuit 52.

In the same manner, a draw-out line 36a, which is an end portion of a coil element included in the coil 36 (at least one of the winding start end 42 and the winding termination end 45), is drawn out in the axial direction from some of the coils 36 of the second stator 30. In the second stator 30, the draw-out line 36a is drawn out to the rear surface side of the base portion 62 (side opposite to teeth 24) through the cutaway portion 63 of the stator core 61. Further, the draw-out line 36a is drawn through an insertion hole (not illustrated) formed in the bottom portion 54a of the yoke housing 54 out of the yoke housing 54 and connected to the second driving circuit 53.

The formation mode of the draw-out lines 26a and 36a (the number of draw-out lines 26a and 36a, which ones of coils 26 and 36 draw-out lines 26a and 36a are to be drawn out from, etc.) is appropriately determined in accordance with the winding mode of the coils 26 and 36.

As described above, the system of the first stator 20 and the first driving circuit 52 and the system of the second stator 30 and the second driving circuit 53 are electrically separated from each other. The first driving circuit 52 controls a three-phase driving current supplied to each coil 26 of the first stator 20, and the second driving circuit 53 controls a three-phase driving current supplied to each coil 36 of the second stator 30.

Next, a description will be given of advantageous effects of the present example.

The outer circumferential edge 62b of the base portion 62 (outer end of each projection 64 in radial direction) is located at a radially outer side of the outer ends 24b of the teeth 24. Thus, the outer circumferential portion of the base portion 62 sufficiently extends outward, thereby limiting a decrease in magnetic path in the base portion 62.

Further, with the outer circumferential edge 62b of the base portion 62 extending outward as described above, the cutaway portions 63, which are recessed radially inward, are provided in the outer circumferential edge 62b. This limits an increase in a projected area of the base portion 62 (stator core 61) in the axial direction while minimizing a decrease in magnetic path in the base portion 62 as described above. In a case in which the stator core 61 includes a soft magnetic powder core (press molding of magnetic powder), if a projected area of the stator core 61 increases in the axial direction, a large-sized press machine is required, resulting in an increase in manufacturing cost. In this regard, the limitation of an increase in the projected area of the stator core 61 in the axial direction limits an increase in manufacturing cost.

In addition, the draw-out line 26a drawn out of the first coil 26 and the draw-out line 36a drawn out of the second coil 36 are inserted into the cutaway portions 63 of the base portions 62 in the respective stators 20 and 30. Thus, the draw-out lines 26a and 36a are accommodated in the body of the stator core 61 in the radial direction. This limits an increase in the size of the brushless motor 50 in the radial direction.

In addition, the brushless motor 50 includes the first driving circuit 52 connected to the coils 26 of the first stator 20 to control the driving current supplied to the coils 26 and the second driving circuit 53 connected to the coils 36 of the second stator 30 to control the driving current supplied to coils 36. According to this configuration, the system of the first stator 20 and the first driving circuit 52 and the system of the second stator 30 and the second driving circuit 53 are electrically separated from each other. Further, the two systems of the coils 26 and 36 are configured to be separated from each other with the rotor 10 interposed therebetween. Thus, in case of a failure of one system causing the coils of the system to generate heat, the effect of the heat on the coils of the other system is minimized, thereby improving redundancy.

In the configuration illustrated in FIG. 14, the inner circumferential edge 62a of the base portion 62 is aligned with the inner ends 24a of the teeth 24 in the axial direction. Instead, as a further example, the inner circumferential edge 62a of the base portion 62 may be recessed radially outward from the inner ends 24a of the teeth 24 as in the above embodiment. Conversely, the inner circumferential edge 62a of the base portion 62 may extend radially inward from the inner ends 24a of the teeth 24.

Figure 15:
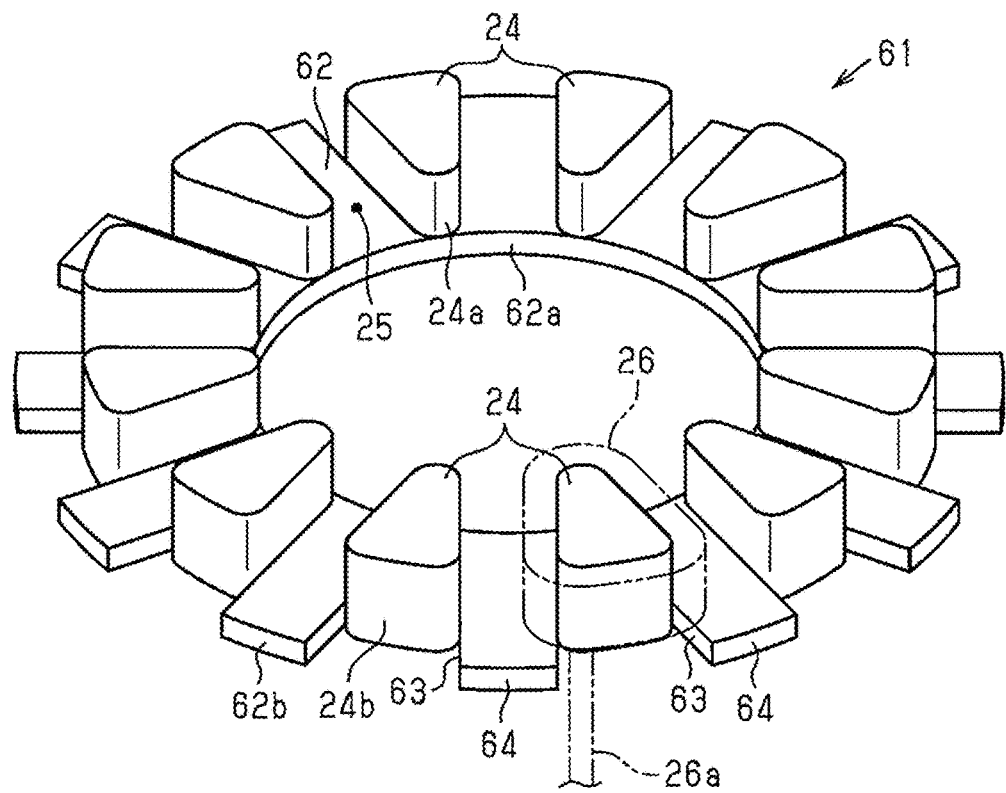
FIG. 15 is a perspective view of a stator core in a further example.

In addition, in the configuration illustrated in FIG. 14, each cutaway portion 63 is provided at a radially outer side of each slot 25. Instead, as a further example, as illustrated in FIG. 15, each cutaway portion 63 may be provided at a radially outer side of each of the teeth 24. In this case, each projection 64 of the base portion 62 located between adjacent ones of the cutaway portions 63 in the circumferential direction is provided at a radially outer side of each slot 25. In such a configuration, it is preferred that the draw-out line 26a of the coils 26 wound around the teeth 24 be inserted into the cutaway portions 63.

Figure 16:
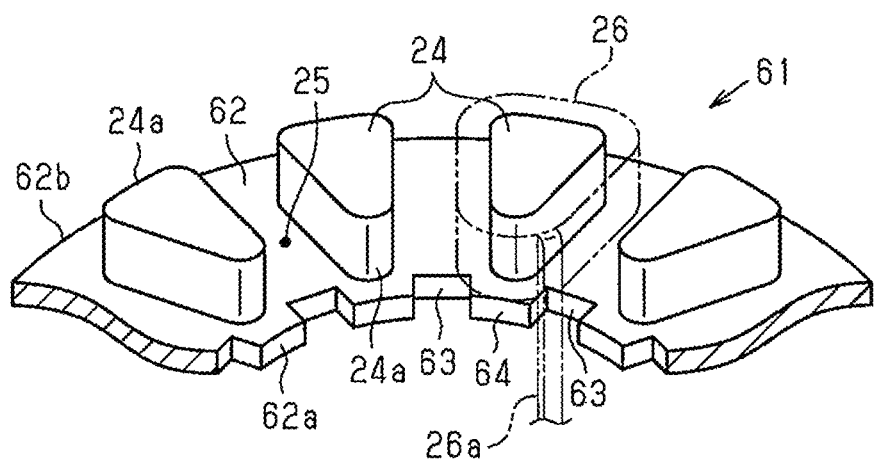
FIG. 16 is a perspective view of a stator core in a further example.

In addition, in the configuration illustrated in FIG. 14, each cutaway portion 63 is provided in the outer circumferential edge 62b of the base portion 62. However, the configuration is not limited thereto. For example, as illustrated in FIG. 16, the cutaway portion 63 may be provided in the inner circumferential edge 62a of the base portion 62. In the configuration illustrated in the same drawing, the inner circumferential edge 62a of the base portion 62 extends radially inward from the inner ends 24a of the teeth 24, and the plurality of cutaway portions 63 is provided in the inner circumferential edge 62a at intervals in the circumferential direction. In such a configuration, it is preferred that the draw-out line 26a of the coils 26 wound around the teeth 24 be inserted into the cutaway portions 63.

In the example illustrated in FIG. 16, each cutaway portion 63 is provided at a radial inner side of each slot 25. However, each cutaway portion 63 may be provided at a radial inner side of each of the teeth 24. In this case, each projection 64 of the base portion 62 located between adjacent ones of the cutaway portions 63 in the circumferential direction is provided at a radial inner side of each slot 25.

In the configuration illustrated in FIG. 16, the outer circumferential edge 62b of the base portion 62 extends radially outward from the outer ends 24b of the teeth 24. However, the configuration is not limited thereto. The outer circumferential edge 62b of the base portion 62 may be located at the same position as the outer ends 24b of the teeth 24 in the radial direction or may be recessed radially inward from the outer ends 24b of the teeth 24.

The above embodiment and further examples may be appropriately combined.

Hereinafter, a description will be given of a second embodiment of an axial gap type brushless motor.

Figure 17:
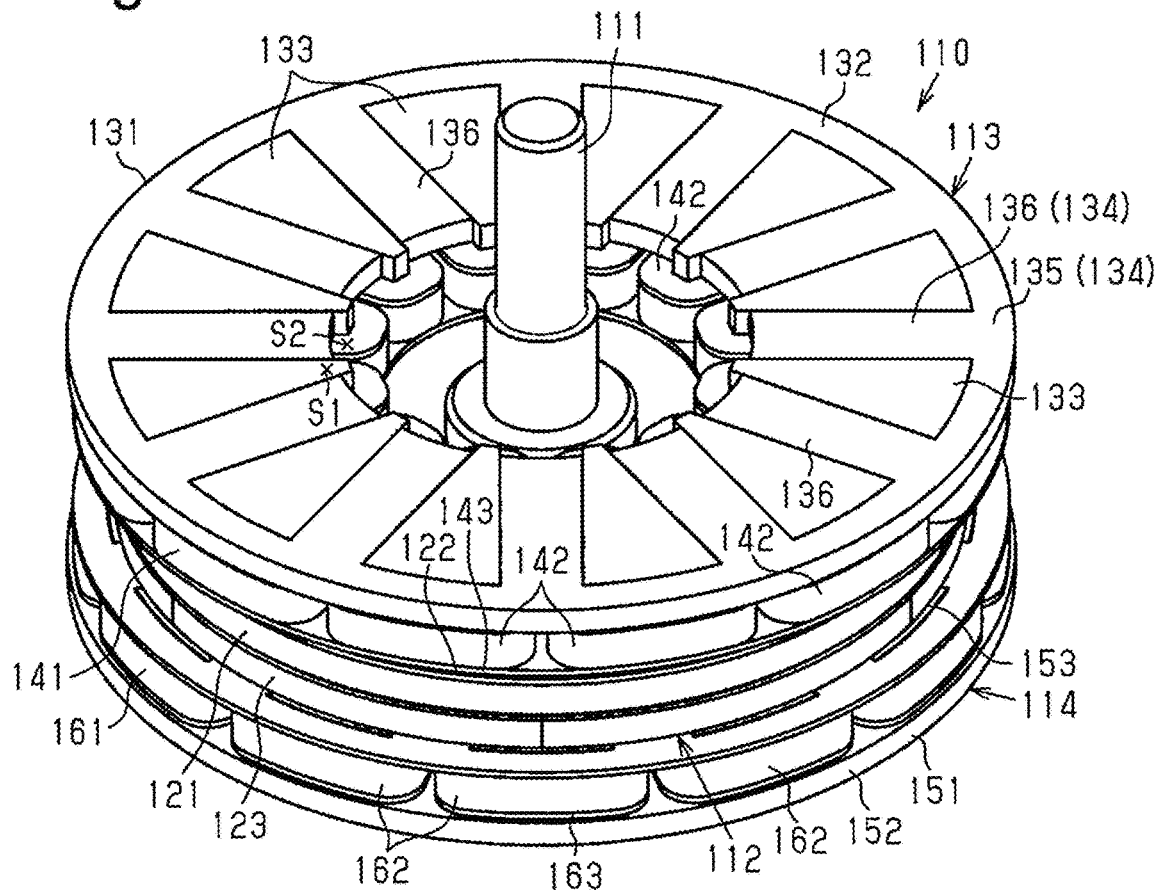
FIG. 17 is a perspective view of a brushless motor according to a second embodiment.

As illustrated in FIG. 17, a brushless motor 110 is an axial gap type motor including a disk-shaped rotor 112 integrally rotatably fixed to a columnar rotating shaft 111 and two stators 113 and 114 (namely, first stator 113 and second stator 114) disposed on opposite sides of the rotor 112 in the axial direction. The rotor 112 and the stators 113 and 114 are accommodated in a housing (not illustrated), and the rotating shaft 111 is rotatably supported with respect to the housing.

Figure 18:
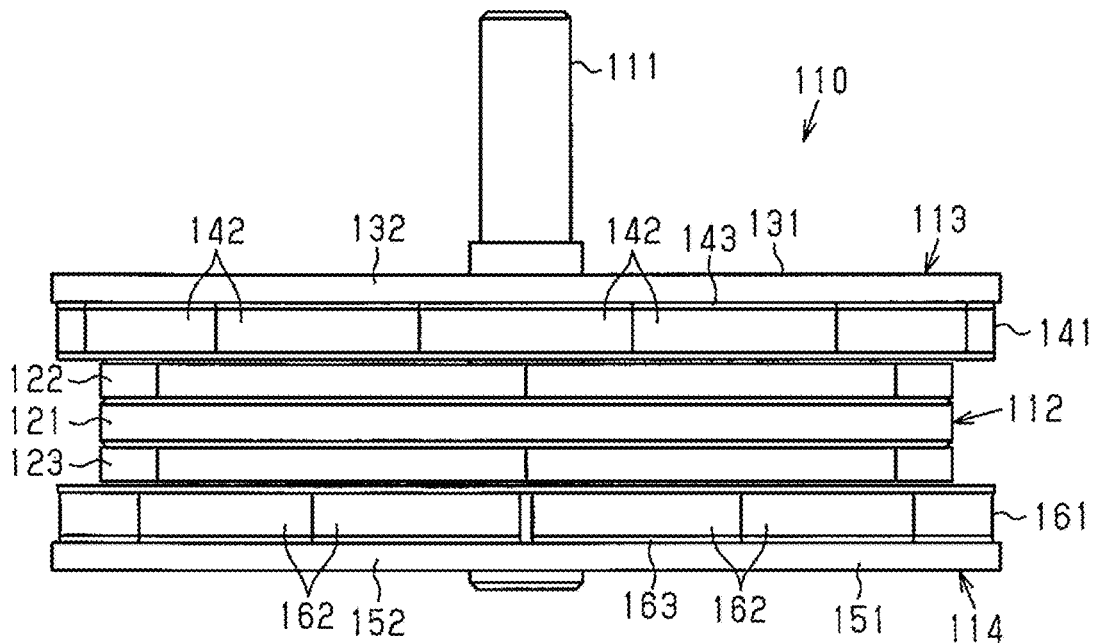
FIG. 18 is a side view of the brushless motor of FIG. 17.

As illustrated in FIG. 17 and FIG. 18, the rotor 112 includes a disk-shaped rotor core 121 and a first magnet 122 and a second magnet 123 fixed to opposite axial end surfaces of the rotor core 121. The rotating shaft 111 is press-fitted into a radial center portion of the rotor core 121. This allows the rotor core 121 to rotate integrally with the rotating shaft 111.

The first magnet 122 fixed to one axial end surface (upper end surface in FIGS. 17 and 18) of the rotor core 121 is provided such that N poles and S poles are alternately arranged in the circumferential direction and has eight magnetic poles (magnetic poles formed on axial end surface of first magnet 122 facing rotor core 121) in the circumferential direction. The eight magnetic poles of the first magnet 122 are provided at equiangular intervals in the circumferential direction.

The second magnet 123 fixed to the other axial end surface (lower end surface in FIGS. 17 and 18) of the rotor core 121 has the same shape as that of the first magnet 122 and has eight magnetic poles provided at equiangular intervals in the circumferential direction. The second magnet 123 is fixed to the rotor core 121 so as to be shifted from the first magnet 122 by one magnetic pole in the circumferential direction. Hence, each magnetic pole of the first magnet 122 and each magnetic pole of the second magnet 123 that overlap in the axial direction differ from each other in magnetic polarity (N pole and S pole).

The first stator 113 includes a first stator core 131 and a first coil group 141 wound around the first stator core 131.

As illustrated in FIG. 17, the first stator core 131 includes an annular first core body 132 (first base portion) and twelve first teeth 133 protruding in the axial direction (extending in axial direction) from the first core body 132 toward the rotor 112.

As illustrated in FIG. 17, a plurality of substantially T-shaped base pieces 134 formed by a stamped steel plate is disposed in the circumferential direction so that the first core body 132 is configured to be annular. Each of the plurality of base pieces 134 has a curved portion 135 and an extension 136 extending radially inward from a substantially central position with respect to the circumferential direction of the curved portion 135. Each curved portion 135 has connecting portions 137 (see FIG. 19) at circumferentially opposite sides of a radially outer part and is formed integrally with (connected to) adjacent ones of the curved portions 135 by the connecting portions 137. Each extension 136 has a distal end at a radially inner side, and when the plurality of base pieces 134 is disposed in the circumferential direction to form the annular shape, the distal ends of adjacent ones of the extensions 136 are spaced apart by a gap S1.

When the base pieces 134 are formed in an annular shape, the first core body 132 is configured so that each of the first teeth 133 is interposed between the extensions 136 of adjacent ones of the base pieces 134 in the circumferential direction. More specifically, each of the first teeth 133 is interposed by the extensions 136 at a position close to the curved portions 135 (radially outer side). Further, each of the first teeth 133 is configured to have a radial dimension that is greater than an extension dimension (radial dimension) of each extension 136. Therefore, in the present embodiment, when the first teeth 133 are interposed between adjacent ones of the extensions 136 in the circumferential direction, a radially inward portion 133a of each of the first teeth 133 protrudes radially inward from the extensions 136 to fill the gap S1. This forms a space S2 between the radially inward portions 133a of the first teeth 133 in the circumferential direction (at radially inner side of extensions 136).

The first teeth 133 are provided at equiangular intervals in the circumferential direction (at intervals of 30° in the present embodiment). In addition, the twelve first teeth 133 all have the same shape. Specifically, each of the first teeth 133 has the shape of a column that is arcuate in the circumferential direction as viewed from the axial direction. In addition, adjacent ones of the first teeth 133 in the circumferential direction are spaced apart in the circumferential direction.

The first coil group 141 includes twelve first coils 142 wound around the respective first teeth 133 by concentrated winding via an insulator 143.

The twelve first coils 142 are repeatedly arranged in the circumferential direction in the order of a U-phase coil, a V-phase coil, and a W-phase coil. That is, the first coil group 141 includes three-phase coils 142 of U-phase, V-phase, and W-phase. In addition, the three-phase coils 142 are electrically connected by a connecting wire (not illustrated) for each phase. The space S2 may be effectively used by arranging the connecting wire in the space S2.

The second stator 114 has the same configuration as that of the first stator 113. That is, the second stator 114 includes a second stator core 151 having the same shape as that of the first stator core 131 and a second coil group 161 wound around the second stator core 151.

The second stator core 151 includes a second core body 152 (second base portion) having an annular plate shape similar to that of the first core body 132 and twelve second teeth 153 protruding in the axial direction (extending in axial direction) from the second core body 152 toward the rotor 112 (rotor core 121).

The twelve second teeth 153 have the same shape as that of the twelve first teeth 133 and are provided at equiangular intervals (at intervals of 30° in the present embodiment) in the circumferential direction.

The second coil group 161 includes twelve second coils 162 wound around the respective second teeth 153 by concentrated winding via an insulator 163. The twelve second coils 162 of the present embodiment are all wound in the same direction.

The twelve second coils 162 are repeatedly arranged in the circumferential direction in the order of a U-phase coil, a V-phase coil, and a W-phase coil. That is, the second coil group 161 includes three-phase coils 142 of U-phase, V-phase, and W-phase. In addition, the three-phase coils 162 are electrically connected by a connecting wire (not illustrated) for each phase. When the connecting wire is arranged in a space (similar to space S2) located between radially inward portions (not illustrated) of second teeth 153 in the circumferential direction, the space may be effectively used.

As illustrated in FIGS. 17 and 18, the first stator 113 is disposed at the side of the first magnet 122 with respect to the rotor 112, and each of the first teeth 133 has a distal end surface facing the first magnet 122 in the axial direction. The second stator 114 is disposed at the side of the second magnet 123 with respect to the rotor 112, and each of the second teeth 153 has a distal end surface facing the second magnet 123 in the axial direction. Slight gaps are provided between the first stator 113 and the rotor 112 facing each other in the axial direction and between the second stator 114 and the rotor 112 facing each other in the axial direction. The first core body 132 of the first stator core 131, the second core body 152 of the second stator core 151, and the rotor core 121 are orthogonal to the axial direction and parallel to each other. Additionally, center axes of the first and second stators 113 and 114 and the rotor 112 coincide with each other. The first stator 113 and the second stator 114 are accommodated in a motor housing (not illustrated) and are fixed to the motor housing.

Next, a description will be given of a method of manufacturing the first stator 113 of the present embodiment. The second stator 114 of the present embodiment has the same configuration as that of the first stator 113, and a manufacturing method similar to the manufacturing method to be described below can be applied thereto.

Figure 19:
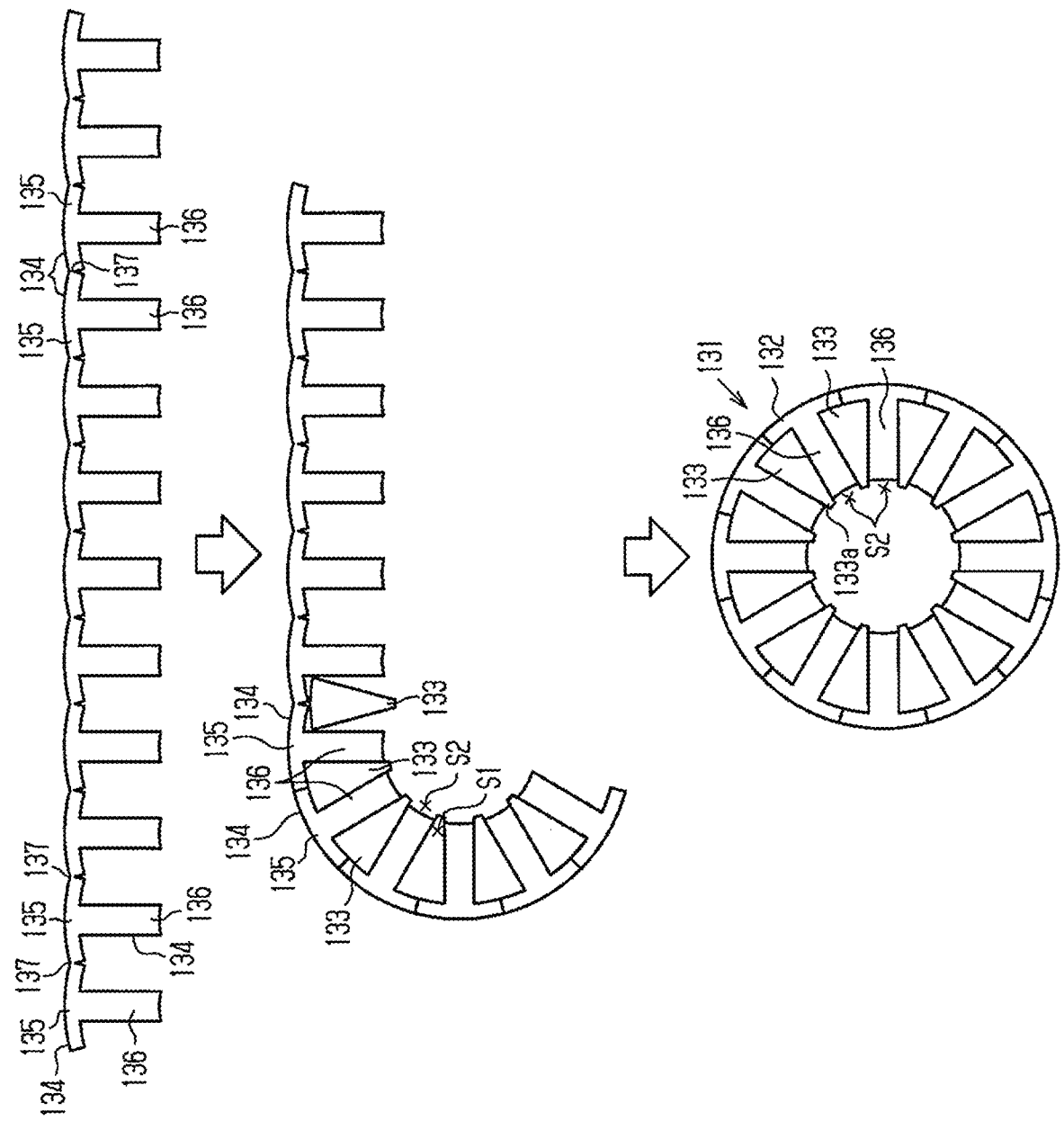
FIG. 19 is an explanatory diagram illustrating a method of manufacturing a stator of FIG. 17.

As illustrated in FIG. 19, firstly, a metal plate (e.g., steel plate) is first stamped to form a necessary number (twelve in the present embodiment) of base pieces 134 for the first stator core 131 as an integrated body (stamping process). At this time, the base pieces 134 are in a state in which adjacent ones of the curved portions 135 (base pieces 134) are connected to each other by the connecting portions 137 of the curved portions 135. In other words, each of the curved portions 135 of the plurality of base pieces 134 has a connecting part.

Subsequently, the base pieces 134 are rotated relative to one another about the connecting portions 137 to dispose the base pieces 134 in an annular shape (annular shape forming process). At this time, the connecting portions 137 are plastically deformed. In addition, in the annular shape forming process, the base pieces 134 are rotated about the connecting portions 137 to form an annular shape in a state in which the teeth 133 made of a soft magnetic powder core are disposed between the extensions 136. As a result, the teeth 133 are interposed and fixed between the extensions 136. The first stator core 131 is completed through the annular shape forming process. The first stator 113 is completed by winding the coil 142 (see FIG. 17) around the teeth 133 via the insulator 143. The coil 142 may be wound around the teeth 133 via the insulator 143 before or after the teeth 133 are interposed and fixed by the extensions 136. For example, after the coil 142 is wound around the insulator 143 in advance, the insulator 143 may be coupled to the teeth 133.

The advantageous effects of the present embodiment will be described.

(4) The teeth 133 are interposed and fixed between adjacent ones of the extensions 136. This eliminates the need for the fixing by press-fitting as performed in a prior art and limits cracking and chipping between members. In particular, as in the present embodiment, when the teeth 133 and the base piece 134 are made of different materials such that the teeth 133 are made of the soft magnetic powder core and the base piece 134 (core body 131) is made of the steel plate, the teeth 133 and the base piece 134 have different strengths. Thus, cracking and chipping easily occur. Therefore, interposing and fixing the teeth 133 as described above has a great effect.

(5) Since the teeth 133 extend radially inward from the extensions 136, the space S2 is formed between the teeth 133 in the circumferential direction. When the connecting wire is arranged in the space S2, another space for the connecting wire does not need to be provided. As a result, the entire stator 113 may be miniaturized in the radial direction.

(6) The radial dimension of the teeth 133 is greater than the radial dimension of the extension 136. This increases the cross-sectional area of the teeth 133 as compared to a case in which the radial dimension of the teeth 133 is the same as the radial dimension of the extension 136. As a result, magnetic saturation is limited in the teeth 133.

(7) The curved portion 135 of each base piece 134 is connected to the curved portions 135 of adjacent ones of the base pieces 134. In the annular shape forming process, the base pieces 134 are rotated about the connecting portions 137 corresponding to connecting parts so that the base pieces 134 are disposed in an annular shape. Thus, the number of welding operations may be reduced.

With respect to any of the effects described above, the same effect can be obtained not only in the first stator 113 but also in the second stator 114.

The above embodiment may be modified as below.

In the above embodiment, when the base pieces 134 of the first stator core 131 are formed in the annular shape, the base pieces 134 formed as an integrated body by the connecting portions 137 are rotated by plastic deformation of the connecting portions 137 so that the base pieces 134 are formed in the annular shape. However, the configuration is not limited thereto.

Figure 20:
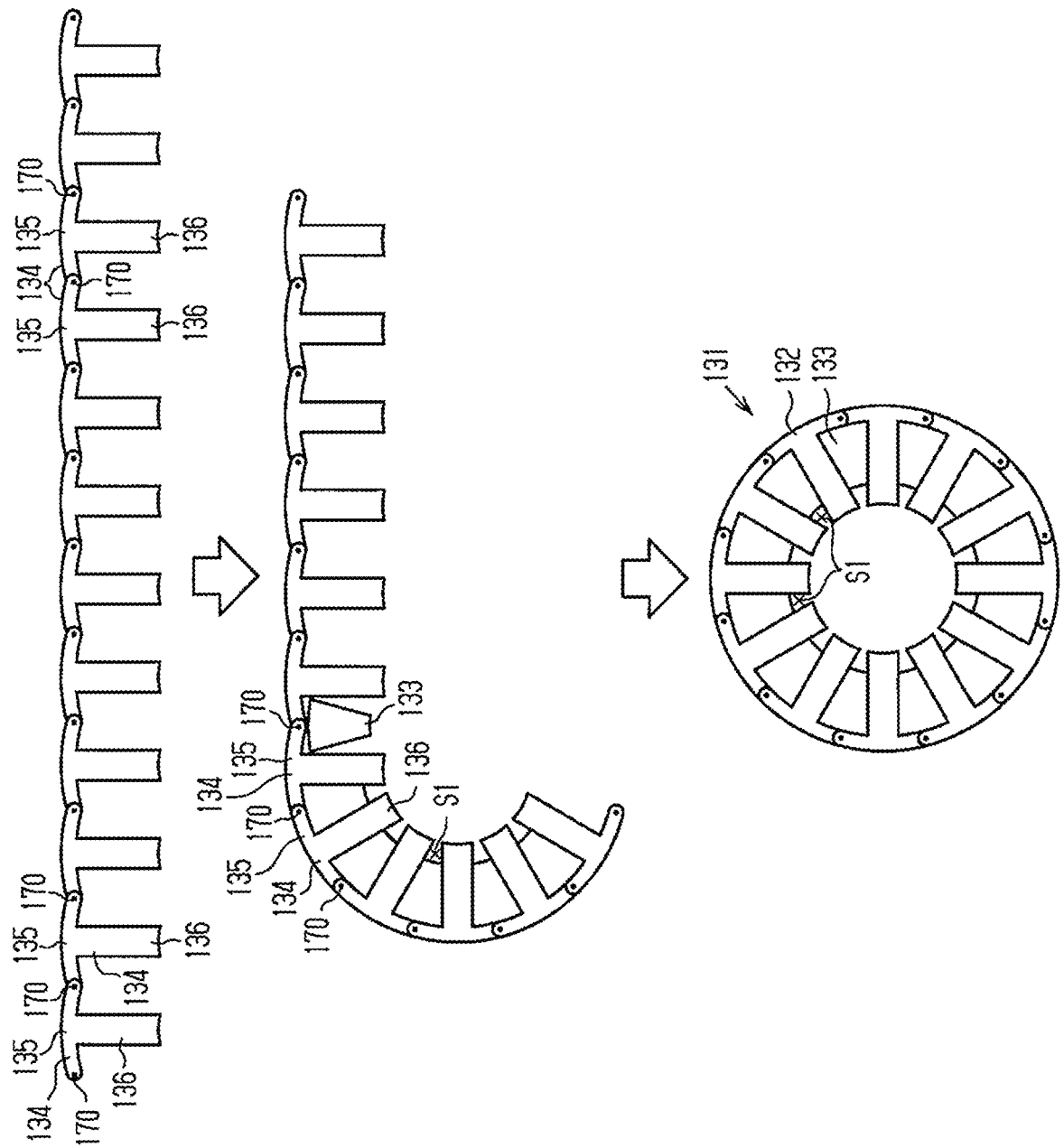
FIG. 20 is an explanatory diagram illustrating a method of manufacturing a stator in a modified example.

As illustrated in FIG. 20, for example, the base pieces 134 may be formed in the annular shape by rotatably connecting opposite ends of the curved portion 135 of one base piece 134 to another base piece 134 with a rotating portion 170 and rotating the one base piece 134 and another base piece 134 about the rotating portion 170. The rotating portion 170 may be configured so that a recess is provided in one of the opposite ends of the curved portion 135 and a projection is provided on the other opposite end. According to such a configuration, the projection formed on one side of a curved portion 135 may be fitted into the recess formed on the other side of another curved portion 135 to allow rotation.

A method may be adapted in which base pieces 134 are divided in advance, and the curved portions 135 of the divided base pieces 134 are fixed to each other by welding. In this case, for example, the base pieces 134 are spaced apart from each other in the circumferential direction to dispose the teeth 133 between the extensions 135, the base pieces 134 are moved radially inward so that the curved portions 135 of the base pieces 134 come into contact with each other, and the contact parts are welded together. This achieves reliable fixing in an annular state.

The above example is not limited to the first stator core 131 and is also applied to the second stator core 151.

In the above embodiment, the radial dimension of the teeth 133 of the first stator core 131 is greater than the radial dimension of the extension 136. However, the configuration is not limited thereto. For example, the radial dimension of the teeth 133 may be the same as the radial dimension of the extension 136.

Figure 21:
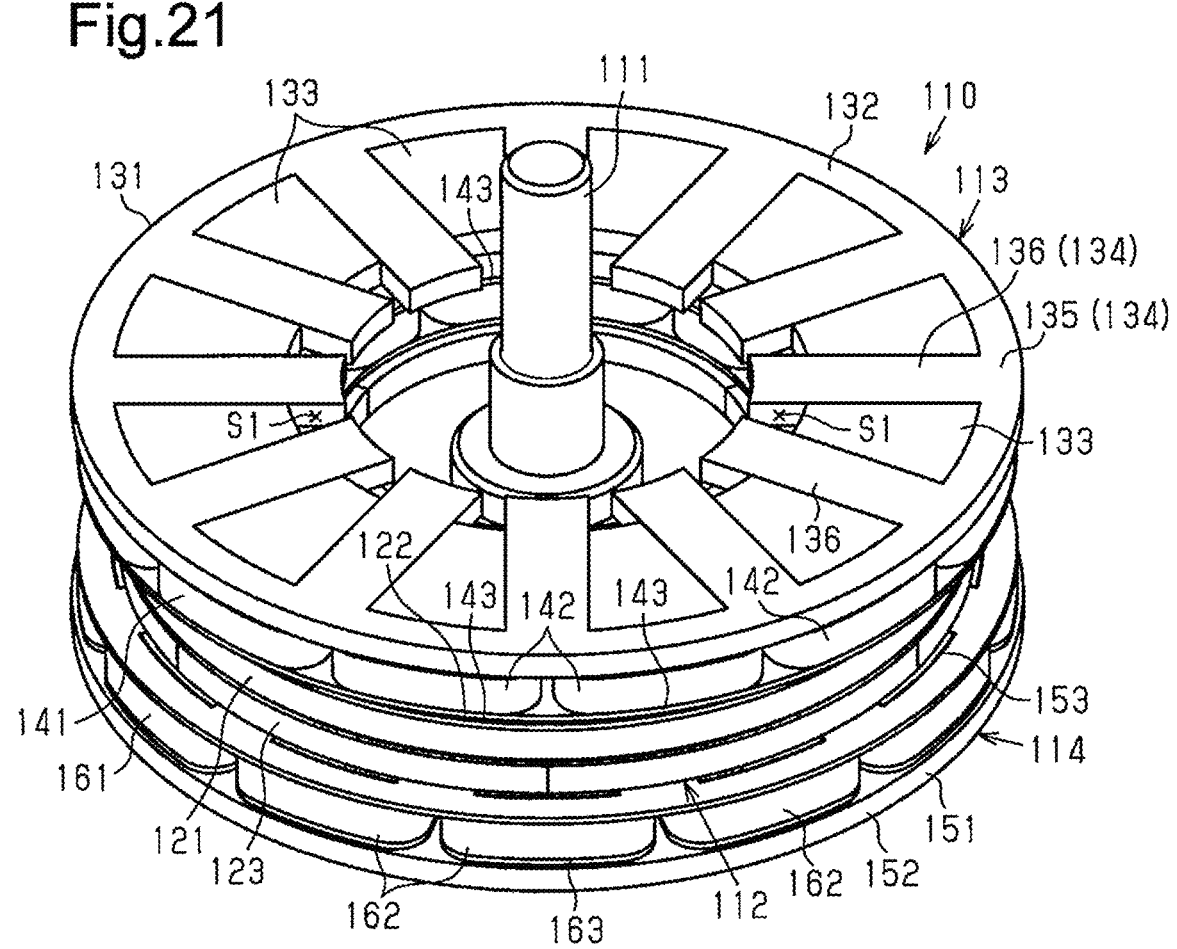
FIG. 21 is a perspective view of a brushless motor in a modified example.

In addition, as illustrated in FIG. 21, the radial dimension of the teeth 133 may be less than the radial dimension of the extension 136. With such a configuration, the extensions 136 hold the gap S1 in the circumferential direction. As a result, a part (end portion) of the coil wound around the teeth 133 may be drawn out through the gap S1.

In the above embodiment, the stators 113 and 114 are provided at axially opposite sides of the rotor 112. Instead, the first stator 113 or the second stator 114 may be provided at only one axial side of the rotor 112.

In the above embodiment, the coils 142 and 162 are wound around the teeth 133 and 153 via the insulators 143 and 163. However, the configuration is not limited thereto. The coils 142 and 162 may be directly wound around the teeth 133 and 153.

Although not particularly described in the above embodiment, for example, the core body 132 may be configured to be stacked.

The above embodiment and modified examples may be appropriately combined.

What is claimed is:

1. A stator of a brushless motor, the stator comprising:
    a stator core including a base portion having an annular plate shape and a plurality of teeth protruding from one surface of the base portion in an axial direction and disposed in a circumferential direction; and
    a plurality of coils respectively wound by concentrated winding along peripheral surfaces of the plurality of teeth,
    wherein the base portion includes an inner circumferential edge that is recessed radially outward from an inner end of each of the plurality of teeth or the base portion includes an outer circumferential edge that is recessed radially inward from an outer end of each of the plurality of teeth,
    the coils are configured as three-phase coils, and each of the three-phase coils has a plurality of coil portions,
    each of the three-phase coils includes a connecting wire connecting adjacent ones of the coil portions to each other, and
    a part of the connecting wire is disposed in a recessed portion of the inner circumferential edge or the outer circumferential edge of the base portion.

2. The stator of a brushless motor according to claim 1, wherein
    in a mode in which the inner circumferential edge of the base portion is recessed radially outward from the inner ends of the teeth, the outer circumferential edge of the base portion extends radially outward from the outer ends of the teeth, or
    in a mode in which the outer circumferential edge of the base portion is recessed radially inward from the outer ends of the teeth, the inner circumferential edge of the base portion extends radially inward from the inner ends of the teeth.

3. The stator of a brushless motor according to claim 2, wherein
    an extension dimension of the outer circumferential edge of the base portion is greater than or equal to a recession dimension of the inner circumferential edge of the base portion, or
    an extension dimension of the inner circumferential edge of the base portion is greater than or equal to a recession dimension of the outer circumferential edge of the base portion.

4. The stator of a brushless motor according to claim 1, wherein
    the part of the connecting wire protrudes toward one side of the coil portions in the axial direction.

5. A stator of a brushless motor, the stator comprising:
    a stator core including a base portion having an annular plate shape and a plurality of teeth protruding from one surface of the base portion in an axial direction and disposed in a circumferential direction;
    a plurality of coils respectively wound by concentrated winding along peripheral surfaces of the plurality of teeth; and
    a motor case for accommodating the stator core,
    wherein at least one of an inner circumferential portion and an outer circumferential portion of the stator core includes a cutaway portion recessed in a radial direction, and
    a draw-out line drawn out from the coil is accommodated in the cutaway portion in the radial direction.

6. The stator of a brushless motor according to claim 5, wherein the cutaway portion is one of a plurality of cutaway portions arranged in the circumferential direction.

7. The stator of a brushless motor according to claim 5, wherein
    the coils include a coil element having a winding start end and a winding termination end, and
    the draw-out line includes at least one of the winding start end and the winding termination end of the coil element that is inserted through the cutaway portion.

8. The stator of a brushless motor according to claim 1, wherein the coils include a coil element corresponding to a flat wire.

9. A brushless motor comprising:
    the stator according to claim 1; and
    a rotor having a plurality of magnetic poles disposed in the circumferential direction,
    wherein the stator and the rotor face each other in the axial direction.

* * * * *